(12) United States Patent
Smart

(10) Patent No.: US 9,996,567 B2
(45) Date of Patent: Jun. 12, 2018

(54) PROCESS AND FRAMEWORK FOR FACILITATING DATA SHARING USING A DISTRIBUTED HYPERGRAPH

(71) Applicant: Georgetown University, Washington, DC (US)

(72) Inventor: J. Cory Smart, Clarksville, MD (US)

(73) Assignee: Georgetown University, Washington, DC (US)

( * ) Notice: Subject to any disclaimer, the term of this patent is extended or adjusted under 35 U.S.C. 154(b) by 407 days.

(21) Appl. No.: 14/724,921

(22) Filed: May 29, 2015

(65) Prior Publication Data

US 2015/0347480 A1 Dec. 3, 2015

Related U.S. Application Data

(60) Provisional application No. 62/005,385, filed on May 30, 2014, provisional application No. 62/114,883, filed on Feb. 11, 2015.

(51) Int. Cl.
*G06F 17/30* (2006.01)

(52) U.S. Cl.
CPC .. *G06F 17/30333* (2013.01); *G06F 17/30324* (2013.01); *G06F 17/30327* (2013.01); *G06F 17/30572* (2013.01)

(58) Field of Classification Search
CPC ............................................... G06F 17/30333

(Continued)

(56) References Cited

U.S. PATENT DOCUMENTS

| 5,752,017 | A | * | 5/1998 | Bhargava | .......... G06F 17/30463 |
| 5,809,499 | A | * | 9/1998 | Wong | ................ G06F 17/30539 178/18.01 |

(Continued)

FOREIGN PATENT DOCUMENTS

| WO | WO 2010/120529 A2 | 10/2010 |
| WO | WO 2010/120529 A3 | 10/2010 |

OTHER PUBLICATIONS

"The Common Gateway Interface" [online], [retrieved on Apr. 26, 2017], 1 p., Retrieved From the Internet: http://web.archive.org/web/20100127611358/http://hoohoo.ncsa.illinois.edu/cgi/.

(Continued)

*Primary Examiner* — Mark E Hershley
(74) *Attorney, Agent, or Firm* — Dawn-Marie Bey; Bey & Cotropia PLLC

(57) ABSTRACT

A knowledge model "overlay" for organizing and analyzing large, dynamic data volumes is implemented as a hypergraph that manifests as a result of a distributed theory-driven data source transformation process. This process maps exponentially growing data into an asymptotically limited information space. Within this space, real-world entities (e.g. people, computers, cities, Earth) and their complex interdependencies (e.g. social networks, connectivity, causal relationships) are represented as attributed hypergraph elements (i.e. both hypervertices and hyperedges). Attributes are represented as state vectors affixed to any hypergraph element. Transformation of source system data into this overlay structure is accomplished with minimal data movement and replication using a universal "pointer" like mechanism that is managed in a decentralized fashion by the respective transformation components. Access to the knowledge overlay is performed via a hypergraph communication protocol (Continued)

encapsulated within a common hypergraph API and accompanying hypergraph toolkit.

13 Claims, 17 Drawing Sheets

(58) Field of Classification Search
USPC .......................................................... 707/743
See application file for complete search history.

(56) References Cited

U.S. PATENT DOCUMENTS

| | | | |
|---|---|---|---|
| 6,108,787 A | 8/2000 | Anderson et al. ............ | 713/201 |
| 6,850,252 B1* | 2/2005 | Hoffberg ............ | G06K 9/00369 |
| | | | 348/E7.061 |
| 6,988,093 B2* | 1/2006 | Pic .................... | G06F 17/30017 |
| 7,603,344 B2 | 10/2009 | Bousquet et al. ................ | 707/3 |
| 7,649,452 B2 | 1/2010 | Zilberstein et al. .......... | 340/531 |
| 8,250,235 B2 | 8/2012 | Harvey et al. ................ | 709/237 |
| 2002/0112181 A1 | 8/2002 | Smith .......................... | 713/201 |
| 2003/0174723 A1* | 9/2003 | DeHon .................. | H04L 45/26 |
| | | | 370/404 |
| 2004/0111639 A1 | 6/2004 | Schwartz et al. ............ | 713/201 |
| 2004/0133536 A1* | 7/2004 | Uceda-Sosa ...... | G06F 17/30604 |
| 2005/0108526 A1 | 5/2005 | Robertson ..................... | 713/166 |
| 2005/0203892 A1 | 9/2005 | Wesley et al. .................... | 707/3 |
| 2007/0182983 A1 | 8/2007 | Wyatt et al. ................. | 358/1.15 |
| 2008/0072290 A1 | 3/2008 | Metzer et al. ..................... | 726/3 |
| 2008/0263130 A1* | 10/2008 | Michalowitz ....... | H04L 12/1859 |
| | | | 709/202 |
| 2009/0055934 A1 | 2/2009 | Jauer .............................. | 726/26 |
| 2009/0254572 A1 | 10/2009 | Redlich et al. .................. | 707/10 |
| 2009/0300002 A1 | 12/2009 | Thomas et al. .................... | 707/5 |
| 2010/0049687 A1 | 2/2010 | Patten et al. ..................... | 706/47 |
| 2010/0287158 A1 | 11/2010 | Toledano et al. ............. | 707/718 |
| 2010/0290476 A1 | 11/2010 | Brindle et al. ................. | 370/401 |
| 2010/0318655 A1* | 12/2010 | Kajiya ....................... | G06F 8/34 |
| | | | 709/225 |
| 2011/0167110 A1* | 7/2011 | Hoffberg ................ | G05B 15/02 |
| | | | 709/203 |
| 2011/0295854 A1* | 12/2011 | Chiticariu ......... | G06F 17/30616 |
| | | | 707/737 |
| 2012/0131189 A1 | 5/2012 | Smart et al. ................... | 709/225 |
| 2012/0131530 A1* | 5/2012 | Moffitt ................ | G06F 17/5027 |
| | | | 716/113 |
| 2012/0330959 A1 | 12/2012 | Kretz et al. .................... | 707/739 |
| 2013/0111434 A1* | 5/2013 | Kajiya ....................... | G06F 8/10 |
| | | | 717/106 |
| 2013/0158975 A1* | 6/2013 | Hwang ................ | G06F 17/2818 |
| | | | 704/2 |
| 2013/0212131 A1* | 8/2013 | Reddy ............... | G06F 17/30958 |
| | | | 707/798 |
| 2014/0122228 A1* | 5/2014 | Wical ..................... | G06Q 30/02 |
| | | | 705/14.53 |

OTHER PUBLICATIONS

"RFC 4122—A Universally Unique Identifier (UUID) URN Namespace" [online], Jul. 2005 [retrieved on Apr. 26, 2017], 33 pp., Retrieved From the Internet: http://tools.ieft.org/html/rfc4122.
"HTTP— Hypertext Transfer Protocol Overview" [online], Copyright 1996-2003 [retrieved on Apr. 26, 2017], 6 pp., Retrieved From the Internet: http://www.w3.org/Protocols/.
F. Hirsch, R. Philpott, and E. Maler, Eds., "Security and Privacy Considerations for the OASIS Security Assertion Markup Language (SAML) V2.0," OASIS, Mar. 15, 2005, 33 pp.
Susan Martin, Ph.D., et al., "Forecasting the Break: Building Community and Capacity for Large-Scale, Data-Intensive Research in Forced Migration Studies," A Prosposal to the National Science Foundation, Feb. 2013, 20 pp.
M. A. Thornton and F. R. Chang, "Security Property Checking for Information Processing Circuitry," Georgetown University and Southern Methodist University, 5 pp., Feb. 28, 2014.

"Rapid Information Overlay Technology (RIOT)—A Unifying Approach for Large-Scale Analytics," Raytheon, 15 pp., Oct. 1, 2011.
J. C. Smart, et al., "Privacy Assurance (a.k.a. The "Black Box")—A High-Assurance Method for Sharing and Analysis of Private Information," Georgetown University, et al., 67 pp., Jan. 29, 2014.
Adali, K. S. Candan, Y. Papakonstantinou, and V. S. Subrahmanian, "Query Processing in Distributed Mediated Systems," Proc. 1996 ACM SIGMOD Conf. on Management of Data, Montreal, Canada, Jun. 1996.
Berners-Lee, J. Hendler, O. Lassila, "The Semantic Web," Scientific American, May 2001.
M. Broecheler, A. Pugliese, and V. S. Subrahmanian, "DOGMA: A Disk-Oriented Graph Matching Algorithm for Rdf Databases," Proc. 2009 International Semantic Web Conference, Washington, DC, Oct. 2009.
M. Broecheler, A. Pugliese, and V. S. Subrahmanian, "COSI: Cloud Oriented Subgraph Identification in Massive Social Networks," Proc. 2010 Intl. Conf. on Advances in Social Networks and Mining (ASONAM—2010), Aug. 2010, Odense, Denmark, pp. 248-255.
M. Broecheler, A. Pugliese, and V. S. Subrahmanian, "A Budget-Based Algorithm for Efficient Subgraph Matching on Huge Networks," Proc. 2011 International Conference on Graph Data Management, Hanover, Germany, Apr. 2011, pp. 94-99.
P. Caravelli, Y. Wei, D. Subak, L. Singh, J. Mann, "Understanding Evolving Group Structures in Time-Varying Networks," ASONAM '13, Proceedings of the 2013 IEEE/ACM International Conference on Advances in Social Network Analysis and Mining, pp. 142-148.
R. W. R. Darling and J. R. Norris, "Structure of Large Random Hypergraphs," The Annals of Applied Probability, vol. 15, No. 1A, 2005, pp. 125-152.
D. Dimitrov, L. Singh, J. Mann, "A Process-Centric Data Mining and Visual Analytic Tool for Exploring Complex Social Networks," IDEA '13, Aug. 11, 2013, Chicago, IL, USA.
A. Pugliese, M. Broecheler, V. S. Subrahmanian, and M. Ovelgonne, "Efficient Multi-View Maintenance Under Insertion in Huge Social Networks," ACM Transactions on the Web, vol. 8, Nr. 2, paper 10 (2014).
J. C. Smart, "The Four-Color Framework—A Reference Architecture for Extreme-Scale Information Sharing and Analysis," Department of Computer Science, Georgetown University, Oct. 2014, http://avesterra.georgetown.eud/tech/4cf.pdf.
J. C. Smart, "Privacy Assurance," International Engagement on Cyber, Georgetown Journal of International Affairs, 2011, http://avesterra.georgetown.edu/tech/privacy_assurance.pdf.
J. C. Smart, "Rapid Information Overlay Technology (RIOT)—A Unifying Approach for Large Scale Analytics," Intelligence and Information Systems, Raytheon Company, Jul. 2010.
J. C. Smart, "Dependency Visualization for Complex System Understanding," Ph.D. Thesis, University of California, Davis, Sep. 1994.
Notification of Transmittal of the International Search Report and the Written Opinion of the International Searching Authority, dated Sep. 3, 2015, for PCT Application No. PCT/US15/33111, 1 p.
International Search Report for PCT Application No. PCT/US15/33111, dated Sep. 3, 2015, 2 pp.
Written Opinion of the International Searching Authority, dated Sep. 3, 2015, for PCT Application No. PCT/US15/33111, 6 pp.
Darlene Storm, "Security in Sexy—Raytheon RIOT Software Tracks People, Predicts Future Behavior," Computerworld, Feb. 11, 2013.
Rosenzweig, Paul S., "Proposals for Implementing the Terrorism Information Awareness System," 2 Geo. J. L. & Pub. Pol'y 169, 2004 (Copyright HeinOnline 2004).
Notification Concerning Transmittal of International Preliminary Report on Patentability (Chapter 1 of the Patent Cooperation Treaty), dated Jun. 6, 2013, PCT/US2011/060332, 1 page.
International Preliminary Report on Patentability, dated May 28, 2013, PCT/US2011/060332, 1 page.
Written Opinion of the International Searching Authority, PCT/US2011/060332, dated Feb. 2, 2012, 4 pages.
DaRosa, Mary, "Data Mining and Data Analysis for Counterterrorism," CSIS Press, Mar. 2004.

(56) References Cited

OTHER PUBLICATIONS

Notification of Transmittal of the International Search Report, dated Feb. 2, 2012, PCT/US/2011/060332.
The International Search Report, dated Feb. 2, 2012, PCT/US2011/060332.
Written Opinion of the International Searching Authority, dated Feb. 2, 2012, PCT/US2011/060332.
Oracle, Cooperative Server Technology for Transparent Data Sharing, Oracle 7™ Serve SQL Language Reference Manual, Aug. 1993, Part No. A12714-1, pp. 4-288-4-303.
Unidirectional Network from Wikipedia [online], Last Updated Jan. 19, 7 pp., Retrieved from the Internet: en.wikipedia.org/wiki/Unidirectional_network.
Myong H. Kang, Ira S. Moskowitz, Stanley Chincheck, "The Pump: A Decade of Covert Fun," Center for High Assurance Computer Systems, Naval Research Laboratory, $21^{st}$ Annual Computer Security Applications Conference, 2005, pp. 1-7.
Multilevel Security, from Wikipedia [online], Last Updated May 31, 2016 [retrieved on May 31, 2016], 11 pp., Retrieved from the Internet: en.wikipedia.org/wiki/Multilevel_security.

* cited by examiner

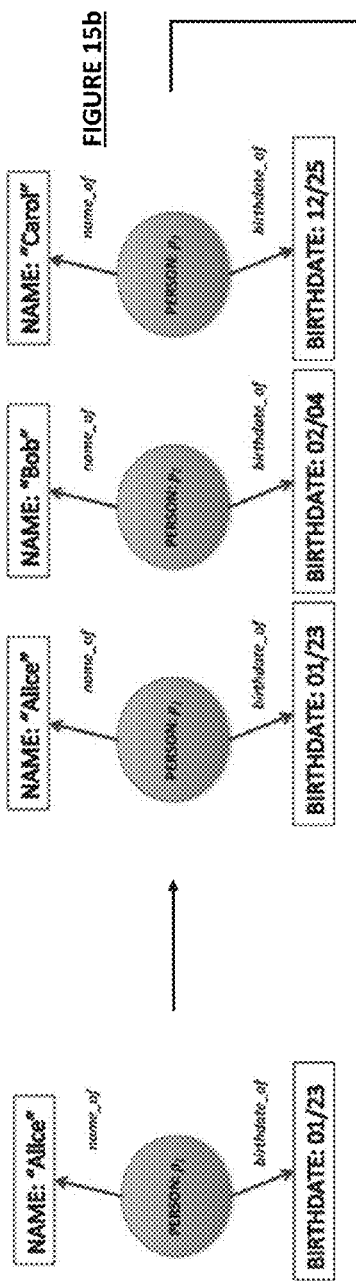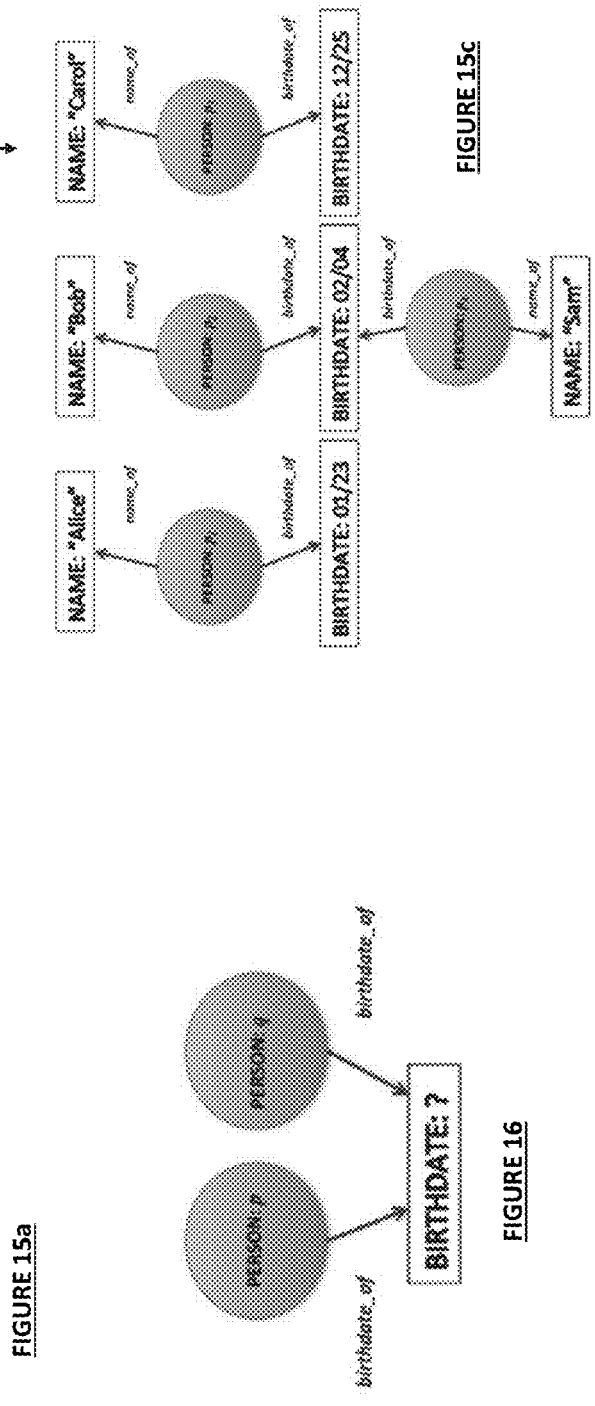

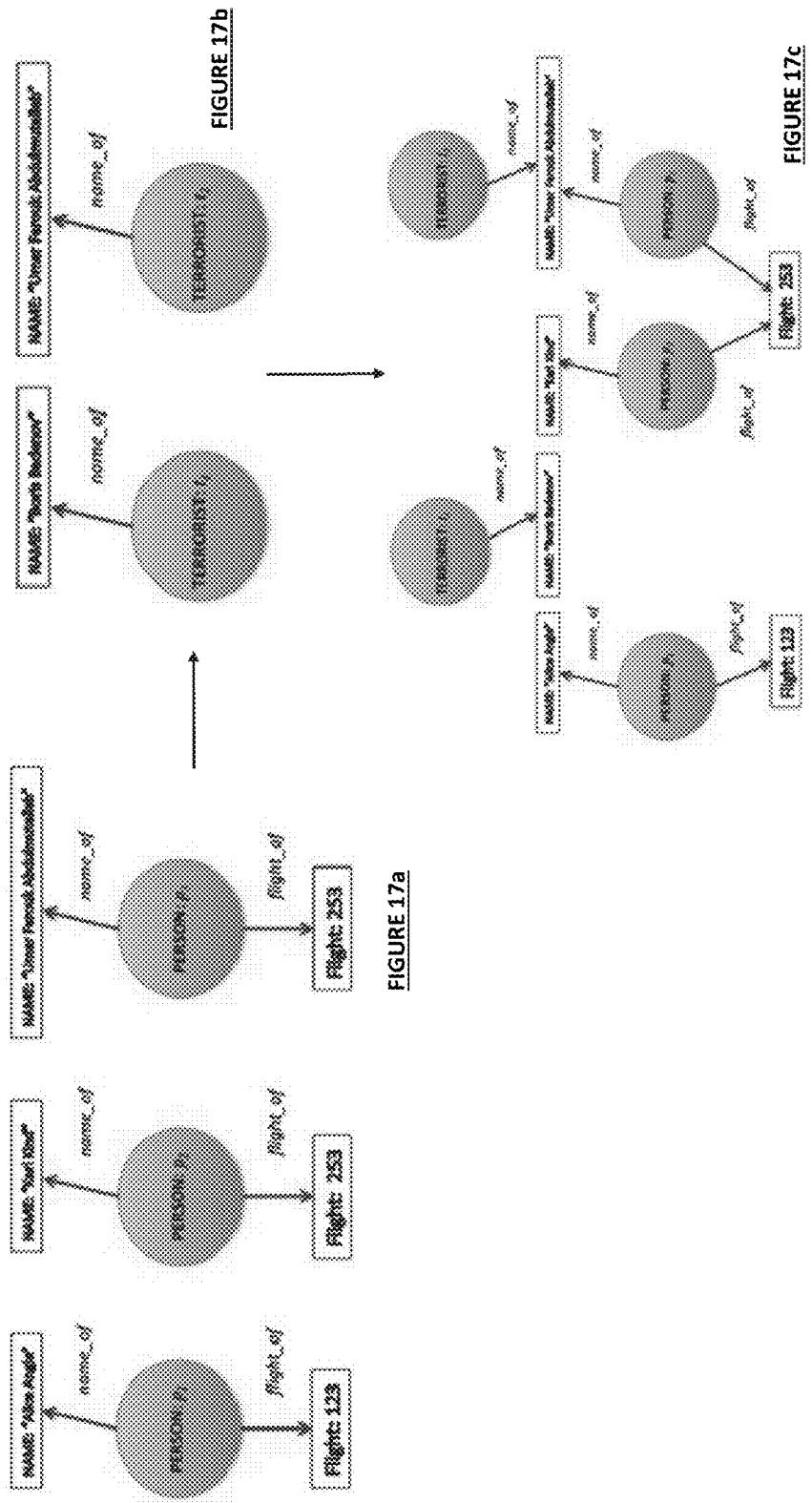

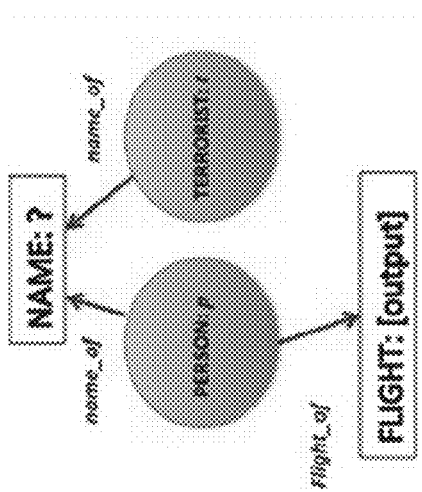
FIGURE 18b
FIGURE 18a

PROCESS AND FRAMEWORK FOR FACILITATING DATA SHARING USING A DISTRIBUTED HYPERGRAPH

CROSS-REFERENCE TO RELATED APPLICATIONS

The present application claims the benefit of U.S. Provisional Patent Application Ser. No. 62/005,385 entitled ARCHITECTURE FOR EXTREME-SCALE INFORMATION SHARING AND ANALYSIS" filed on May 30, 2014 and U.S. Provisional Patent Application Ser. No. 62/114,883 entitled GLOBAL HYPERGRAPH APPROACH TO REDUCING COMPLEXITY FOR ACCELERATED MULTI-DISCIPLINARY SCIENTIFIC DISCOVERY filed on Feb. 11, 2015, the disclosures of which are incorporated herein by reference in their entireties.

BACKGROUND OF THE EMBODIMENTS

Field of the Embodiments

Embodiments of the invention relate to the field of large-scale, multi-source data sharing. More particularly, embodiments of the invention relate to an infrastructure for facilitating data sharing and analysis across disparate data sources in a secure, distributed process.

Description of Existing Art and Identification of Technical Problem

Our world is a complex place. It is faced with many difficult, interdependent problems; some caused by nature, others caused by man. As individuals, families, communities, and nations, we face an ever changing and compounding series of perplexing challenges spanning numerous domains: defense, health, climate, food, cyber, energy, transportation, education, weather, the economy. Compounding pressures in each of these areas threaten our health, our safety, our security, our livelihood, and our sustainability. We seek improved capabilities to detect, understand, mitigate, and prevent our brave new world of threats. To address these challenges, we invariably resort to science, our systematic enterprise for building and organizing knowledge that helps us understand, explain, and predict our world around us. At the core of science is inquiry. We formulate questions. We generate hypotheses. We predict consequences. We experiment. We analyze. We evaluate. We repeat. Our problems are complex; the process is slow.

Fueling the scientific process are the observations we make and the data we collect. With the advent of the 21st century telecommunications explosion, data is now flowing and evolving all around us in massive volumes, with countless new streams, mixing and shifting each minute. This data space is enormous and continuously changing. And by many accounts, its expansion and movement has only just begun. Analyzing and understanding this vast new ocean of data is now of paramount importance to addressing many of the complex challenges facing our world.

Today's data analytic industry is vibrant with a continuous supply of new and innovative products, services, and techniques that thrive and prosper based on their relative merits in the respective marketplaces. Unfortunately, these components are rarely interoperable at any appreciable scale. Moreover, the rapid proliferation of analytic tools has further compounded the problem. With only loose coordination, these partial solutions are ineffective at combating the broad spectrum of problems. Attempting to impose a "one-size-fits-all" analytic solution, however, across today's tremendous data expanse poses significant scientific, technical, social, political, and economic concerns. Consequently, an enormous amount of resources must regularly be expended to address isolated issues and mitigate specific threats. Thus, the analytic community faces considerable challenges dealing with major classes of problems—particularly those at national and international levels.

Specifically, data and analytics collaborators often adopt unique trust relationships with data source owners, evolve unique analytic approaches, use a variety of visualization systems, and leverage a diversity of analytic platforms and tools. Managing a shared knowledge space that is centrally located requires all transactions between these items to flow into a single site and then flow back out, creating a bottleneck and a single-point of failure. The loss or deterioration of the central point's resources implies the loss or deterioration of the entire knowledge space. Replicating the knowledge space with multiple sites serving as mirrors and/or backups leads to unnecessary duplication, complex interfaces, large data movement, and complicated synchronization, privacy, and security policies. Institutionally, such alternatives invariably require organizations to commit to a structure over which some may have little control, whilst placing greater operational burden, responsibility, and control on others. Balancing all these factors invariably leads to difficult negotiations involving data ownership, knowledge curation, organizational autonomy, and research independence. Accommodating the continuous flood of new and ever-changing data, theories, and interpretations also requires a dynamic knowledge space, further challenging a centralized design.

Accordingly, there is a need for a solution that addresses numerous issues standing in the way of sharing data for analytics on a global scale. These issues include, for example: the massive logistics problem with attempting to integrate thousands of government/non-government data systems at scale when the systems have different standards, models, security, infrastructure, procedures, policies, networks, access, compartments, applications, tools, protocols, and the like; the increased security risk that follows large-scale integration of data resources; the lack of analytic algorithm techniques to automatically detect data patterns and provide alerts, i.e., the means to transition from "analytic dumpster diving" to early-warning indication and real-time notification; and the privacy tensions between security and liberty.

SUMMARY OF THE EMBODIMENTS

The present embodiments describe an approach for organizing and analyzing our new data-centric world, rapidly sharing information derived from that data, unifying this information into a common global knowledge framework, and enabling scientific analysis at a scale never before possible. The approach is a transformative, multi-disciplinary approach to collaborative global-scale integrative research. This approach offers a new method for dramatically reducing complexity and accelerating the scientific discovery process. This approach was specifically formulated to address extremely complex problems related to global security, world health, and planet sustainability. The approach advocates the construction of a unified global systems model. At the core of its design is an extensible knowledge representation architecture specifically crafted for large-scale, high-performance, real-time scientific analysis of heterogeneous, dynamic and widely distributed data sources without compromise of data security, safety, or privacy. By way of example, the approach may be applied for SIMPLEX Knowledge Representation as discussed herein.

The approach employs a powerful integration of advanced concepts and emerging capabilities selected from across the government, commercial, laboratory, and academic sectors. The resulting framework offers participants a pragmatic means to think globally, leveraging the aggregate of combined knowledge to further science, and better inform local, regional and international decision making. This approach exploits the uniqueness of heterogeneous data sources and diverse scientific theories, weaving all such points together into a powerful collaborative fabric. Great care, however, must be taken with this stitching process. The movement and replication of data is costly and risks inappropriate information disclosure and/or compromise. The farther data flows from its source, and the more information that is aggregated by an increasing number of parties, the greater the security and privacy concerns and accompanying loss of autonomy. As described herein, the approach addresses these concerns in its foundational design tenets.

The primary goal of this approach is to achieve a computational science analog to self-sustained nuclear fission. That is, the approach advocates a method for reaching a critical knowledge (mass) density that is capable of sustaining an unprecedented analytic (energy) yield. To achieve such high levels, the approach grapples with scale right from the onset, encouraging knowledge enrichment "downward" in addition to traditional data pipeline scaling "upward". To this end, the approach includes the construction of a knowledge representation structure that spans the planet and numerous of its complex, interdependent subsystems. The construction of this structure is accomplished via carefully formulated transformations of the world's exponentially increasing data into an asymptotically limited information space. This technique enables global-scale computational tractability, promising a reduction in integration time and cost from quadratic down to linear in the number of source data systems. Thus, the analytic framework offered provides a practical, achievable means for accomplishing multi-disciplinary research across many diverse, complex and often heavily interdependent domains. The results of this work offer a conceptually simple yet elegant method for the scientific community to manage complexity across many heterogeneous domains at a scale never before possible.

The solution described herein prescribes an innovative method for achieving the above-identified objectives through the construction of a knowledge model "overlay" for organizing and analyzing large, dynamic data volumes (e.g. the World-Wide Web). This overlay is implemented as a hypergraph that manifests as a result of a distributed theory-driven data source transformation process. This process maps exponentially growing data into an asymptotically limited information space. Within this space, real-world entities (e.g. people, computers, cities, Earth) and their complex interdependencies (e.g. social networks, connectivity, causal relationships) are represented as attributed hypergraph elements (i.e. both hypervertices and hyperedges). Attributes are represented as state vectors affixed to any hypergraph element. Transformation of source system data into this overlay structure is accomplished with minimal data movement and replication. Rather, the overlay structure is populated using a universal "pointer" like mechanism that is managed in a decentralized fashion by the respective transformation components. Access to the knowledge overlay is performed via a hypergraph communication protocol. This protocol was specifically designed with formal mathematical verification in mind to enable extremely robust security and "black box" privacy isolation techniques. This protocol is encapsulated within a very simple, common hypergraph API and accompanying hypergraph toolkit that shield the scientific research community from much of the implementation engineering details.

The solution supports both qualitative and quantitative knowledge, but makes a distinction between knowledge that characterizes the temporal state of a system versus that which defines the dynamics of its state changes. The former is represented within the knowledge hypergraph structure, while the latter is embodied within the surrounding analytic components that produce and consume this structure. The solution was specifically formulated to accommodate an enormous diversity of data. The scheme discourages data movement beyond the boundaries of its system of origin. To achieve this objective, source data is fundamentally treated as scientific observations or measurements of some set of interdependent subsystems (e.g. an individual, cyberspace, Earth). The transformation components are used to map source system data into the knowledge overlay structure, thus minimizing data replication and movement. Except when cached for performance reasons, data largely remains at rest in its origin system and in its original structure and form. This approach discourages notions of a universal data representation or universal data federation as an effective means to complexity reduction. Rather, it advocates that data be acted upon locally with transformation components that map sources into a shared knowledge model.

Modularity and scalability are at the core of the preferred solution. The development of this design was driven by pragmatic engineering constraints to ensure practical implementation and performance, given current and emerging computational resources and technology. Although domain-agnostic, the approach is directed at hypergraph representation of macroscopic entities and their relationships (e.g. people, cities, social networks, cyberspace) in contrast to the comparatively unbounded data world of microscopic structures. Microscopic-level information can, however, be affixed to hypergraph elements as attribute state vectors. In addition, the solution does allow for recursive application of itself. The solution can be applied to discrete micro-level sub-systems that in turn can be integrated into a single larger macro-level system via hierarchical application of its principles.

While domain-agnostic, the utility of this approach is highly dependent upon the existence of a unified (but extensible) ontological framework that formally defines a system's knowledge model structure. Historically, without taking careful precautions, ontology development can evolve into a horribly nightmarish resolution process. However, by constraining the knowledge model scope to real-world entities that obey an asymptotically limited discovery/growth profile (e.g. people, organizations, cellphones), this process can be dramatically simplified. The solution thus prescribes a flexible ontological process that balances entity/relationship type specification with attribute type extension. In this setting, the incorporation of multiple domains/use cases is encouraged very early on as the distillation of this balance can be accelerated considerably.

In a first implementation, a process for organizing data from multiple heterogeneous data sources in a knowledge graph, the knowledge hypergraph being accessible by multiple unrelated analytics, is described. The process includes: receiving a first data set from a first data source at a first of multiple hypergraph servers; graphing by the first hypergraph server first data from the first data set in a knowledge hypergraph in accordance with a knowledge model (M), the knowledge hypergraph being defined by hypergraph elements including hypervertices and hyperedges, wherein attributes of the first data are represented in the hypergraph by first state vectors affixed to one or more hypergraph elements; receiving a second data set from a second data source at a second of multiple hypergraph servers; graphing by the second hypergraph server second data from the second data set in the hypergraph, wherein attributes of the second data are represented in the hypergraph by second state vectors affixed to one or more hypergraph elements; further wherein at least one of the first state vectors and at least one of the second state vectors is affixed to the same hypergraph element; receiving at the first hypergraph server from a first analytic a search request directed to the hypergraph; and querying by the first hypergraph server the hypergraph, wherein query results include attributes from both the first data and the second data.

In a second implementation, a process for requesting information from a distributed knowledge graph, is described. The process includes: formulating, at a first adapter, a query directed to a first hypergraph element of the distributed knowledge graph using a common hypergraph application programming interface for processing by a first hypergraph server associated with the first adapter, the first hypergraph server being programmed to receive queries in a format of the common hypergraph application programming interface and further being programmed to communicate with other hypergraph servers using a defined hypergraph transfer protocol (HGTP); packaging, by the first hypergraph server, the query into a HGTP query message and forwarding the query message to a second hypergraph server in accordance with first location instructions for the first hypergraph element at a second adapter; receiving, by the second hypergraph server, the packaged query message, un-packaging the packaged query message and relaying the query to the second adapter; retrieving results to the query from the associated first hypergraph element by the second adapter and returning the results to the second hypergraph server using the common hypergraph application programming interface; and packaging, by the second hypergraph server, the results into a HGTP results message and forwarding the results message to the first hypergraph server in accordance with second location instructions for the first adapter associated therewith.

In a third implementation, a framework to provide information sharing and analysis over a knowledge hypergraph is described. The framework includes: a first layer including multiple data sources, wherein the multiple data sources include at least one structured data source and at least one unstructured data source; a second layer, including multiple servers and multiple associated adapters, for transforming structured and unstructured data from the multiple data sources for use by a third layer and further wherein the multiple data sources, multiple servers and multiple associated adapters are accessed using a common hypergraph application programming interface; a third layer including the knowledge hypergraph comprised of hypergraph elements formed from the transformed structured and unstructured data, the hypergraph elements being distributed over the multiple servers and multiple associate adapters and being accessible from server to server using a defined hypergraph transfer protocol (HGTP); and a fourth layer including accessing components for initiating queries to and receiving results from the knowledge hypergraph using the common hypergraph application programming interface.

SUMMARY OF THE FIGURES

The Summary of the Embodiments, as well as the following Detailed Description, are best understood when read in conjunction with the following exemplary drawings:

FIGS. 15a-15c illustrate a first exemplary privacy assurance block box use case described herein;

FIG. 16 is an exemplary logic statement (pattern) specified as a graph for input to the black box in accordance with first use case of FIGS. 15a-15c;

FIGS. 17a-17c illustrate a second exemplary privacy assurance block box use case described herein;

FIG. 18a illustrates an exemplary logic statement (pattern) specified as a graph for input to the black box in accordance with second use case of FIGS. 17a-17c; and FIG. 18b illustrates an exemplary output from the black box in accordance with second use case of FIGS. 17a-17c.

DETAILED DESCRIPTION

Figure 1:
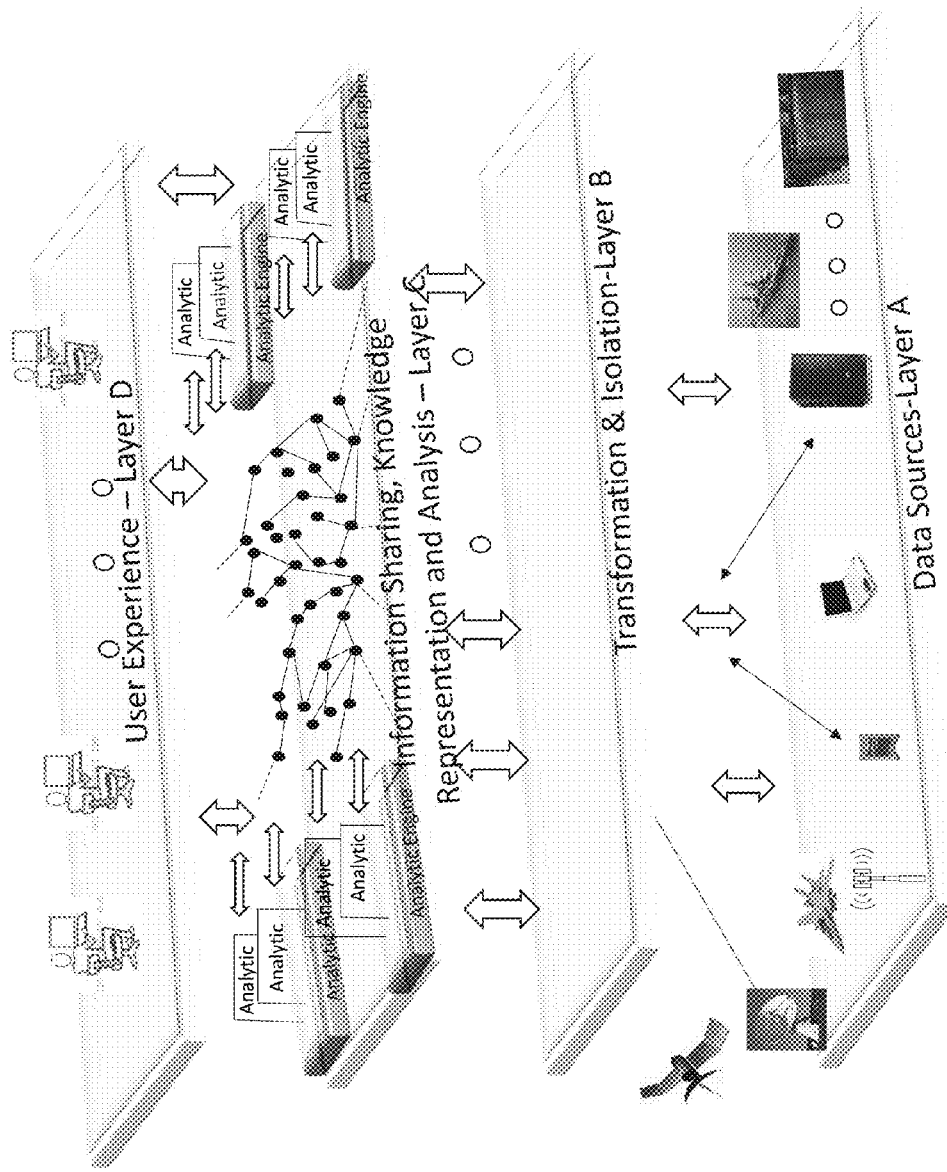
FIG. 1 is a first schematic of the framework described herein to implement preferred embodiments.

The knowledge-share infrastructure framework identifies four fundamental layers of technology, depicted in FIG. 1. These four layers each serve a critical core function. In unison, these functions work together to provide an end-to-end solution for extreme-scale information sharing and analysis. These four specific layers were very carefully formulated from fundamental computational science principles to ensure rapid and open innovation and leverage capabilities proven within other domains.

Layer A "Source Data Systems"—This layer comprises a complex system's (e.g. our world's) vast, complex, heterogeneous collection of raw, processed, correlated, and uncorrelated data spanning public, private, commercial, and government systems—including databases, repositories, files, the web, archives, live feeds, real-time control systems, etc.—highly distributed throughout an enterprise, region, nation, or the planet.

Layer B "Transformation & Isolation"—This layer provides a critical transformation of Layer A source data into the Layer C knowledge model. This transformation is guided by domain theory and the Layer C ontology. In addition, Layer B enables a robust security and privacy isolation barrier that is extremely difficult to physically or electronically defeat. This boundary enables distributed Layer A systems to interoperate at global scale without requiring centralized management.

Layer C "Information Sharing, Knowledge Representation and Analysis"—This layer provides a unification of the many Layer A systems beneath, offering a distributive, high security/privacy-assured fabric for sharing information, representing knowledge, and performing collaborative global-scale analysis. This layer is structured as an extremely large, decentralized formal knowledge hypergraph.

Layer D "The User Experience"—This layer interacts directly with researchers, scientists, users, and operators, providing visualization applications, decision support functions, situational awareness services, prediction and mitigation tools, large-scale simulation, alerting and notification, and command and control capabilities, each tunable to the particular domain application.

The instantiation of this framework described herein employs a parallel collection of data space to information space transformations. While data growth is essentially unbounded, the rate at which physical world entities characterized by this data are revealed (discovered) typically asymptotically approaches a finite upper bound. That is, while the data flood may never subside, its flow describes a relatively finite number of objects in our physically constrained world (e.g. people, organizations, computers, phones, cars, cities, roads, power lines, etc.) statistically discovered and characterized at an asymptotic rate. The quantity of such entities may seem large, however, the upper bound on the number of such items of analytic interest is now computationally manageable in the new "Big Data" era (e.g. 7 billion people, 2 billion smart-phones, 40,000 cities, 11 million miles of paved roads). One of the key concepts embodied in the approach described herein is the transformation of data into an information space that is naturally limited by these finite aspects of the planet. The approach is fundamentally designed as a global system representation technique.

While data growth has been proceeding on an exponential path, the preserved volume of data over time d(t) must ultimately be linearly limited by the maximum physical data collection rate at the sources multiplied by the filtering rate at which data must be discarded due to finite storage requirements, or $$d(t) \rightarrow c*(t-t_0)*f$$

where c=the collection rate and f=the filtering rate. To keep up, current data processing practice must either increase the storage limit or increase the filtering rate. Unfortunately, neither option is attractive. A continuous increase in storage implies a continue increase in cost (and associated power, space, and cooling); discarding data implies an irretrievable loss of an important asset. The asymptotic nature of information discovery holds the key. That is, for each data source, the discovery of "information" over time can be calculated via $$i(t) = (1 - e^{-t/T})$$

where $n_0$ is represents the entity population limit and T is the "time constant" of the source with $T = n_0/r$ where r=the information entity collection rate. Interestingly, each of these quantities can be measured and/or calculated for every data source, providing key architectural metrics.

A large segment of analysis is dedicated to understanding real-world (or virtual world) entities and their complex interrelationships and dependencies. In computer science jargon, a representation of this understanding is frequently referred to as computational knowledge. The framework was specifically formulated to aid the representation and capture of such knowledge. This is most invaluable, although perhaps not immediately obvious. Recall the asymptotic behavior of Information discovery. Although the time 'constants' may actually vary over extended periods, observations of specific types of entity relationships exhibit this same asymptotic behavior. Of keen analytic interest is when the entities and their relationships are aggregated into a single construct. The power of this knowledge aggregation process is now a fairly widely known and frequently applied, leveraging basic graph theory (i.e., loosely speaking, the mathematical study of node/link structures). The framework described herein applies this process at global scale to aid the creation of a knowledge base with world coverage. The estimated upper bound of such a knowledge base equates roughly to a graph of approximately one trillion nodes and one quadrillion links.

Figure 2:
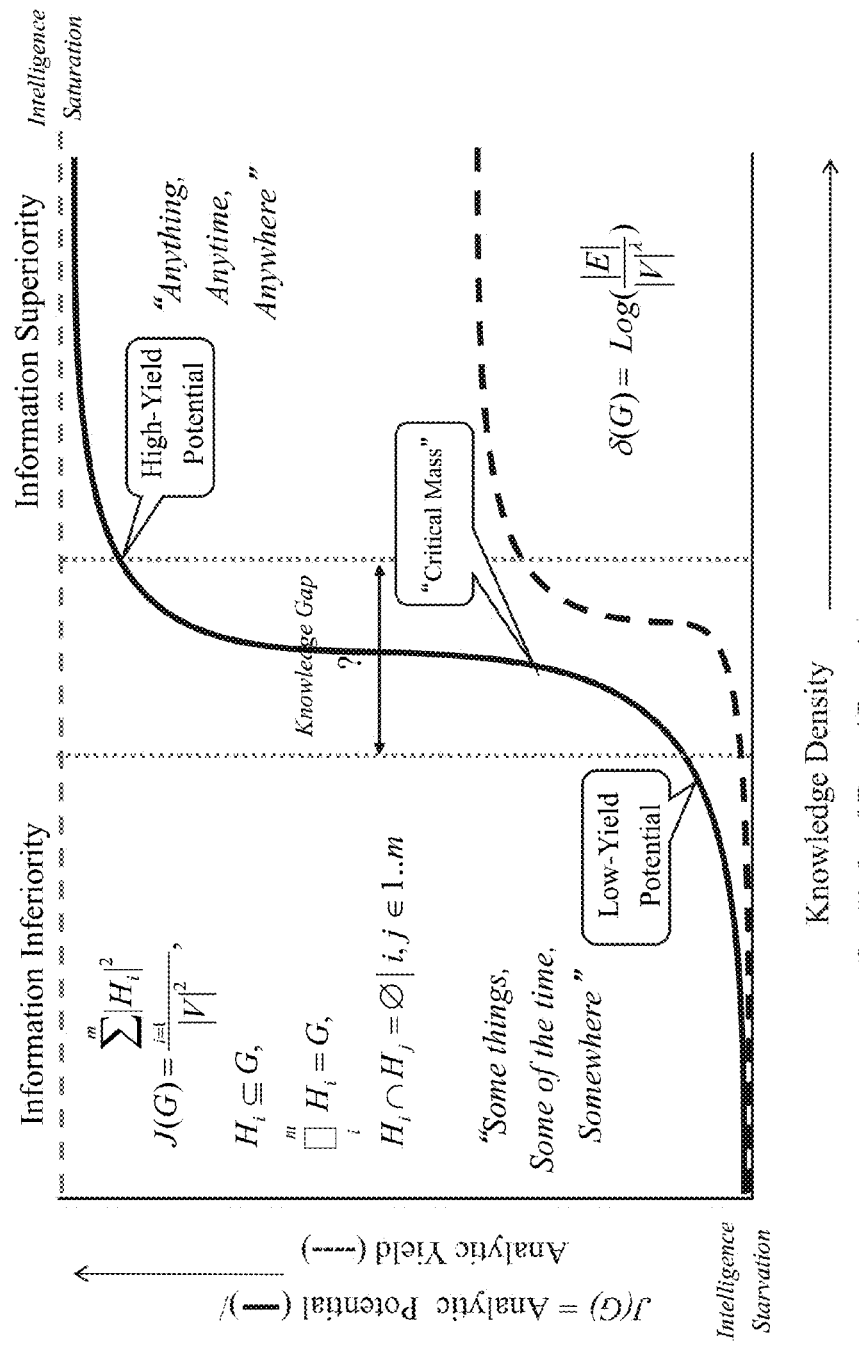
FIG. 2 graphs the nature of knowledge aggregation.

The utility of a knowledge representation of our world would be extraordinary. Knowledge aggregation (in contrast to data aggregation) is an extremely powerful method for enabling a significant boost to analytic yield. In simple terms, analytic yield can be loosely described as the amount of analytic "work" that can be accomplished during a fixed duration of time. While analytic work performed by a person is generally considerably richer than that of a machine, a computer is particularly adept at examining exceptionally large volumes of entities and relationships for specific patterns. When knowledge is aggregated in this fashion, analytic yield increases significantly once a "critical mass" is reached, as shown in FIG. 2. Achieving this high analytic yield is the primary goal of the framework described herein.

These notions are calculable, providing two important quantitative framework metrics. The knowledge density ($\delta$) of an information space characterizes its connectedness and can be determined by the formula:

$$\delta = \frac{|E|}{|V|^\lambda}$$

where $|V|$ is the number nodes (entities), $|E|$ is the number of links (relationships). The exponent $\lambda$ in the denominator is used for normalization purposes depending upon the domain since $|E|$ is potentially $O(n^2)$ larger than $|V|$. An information space with $\delta=1$ implies a fully connected knowledge base; $\delta=0$ is fully disconnected.

The notion of analytic yield characterizes the number of computational inferences that an analytic engine could potentially perform given a specific knowledge base. Analytic yield is thus likened to potential energy (or work) in physics and can be computed via the formula:

$$w \approx J(G) = \sum_{i=1}^{m} \frac{|H_i|^2}{|V|^2}$$

where $H_i$ is the i'th connected component of the m-connected graph G=(V,E) that represents the knowledge base.

The key milestone of a framework instantiation is to achieve a "critical mass" density for a given set of data sources such that the analytic yield is at least, say, 10× over conventional data-centric processing approaches. Used in combination, these metrics can be incorporated into an overall integration analytic power rating (p) to compare performance and effectiveness of framework instantiations and competing architectural approaches:

$$p = \frac{dw}{dt}$$

The solution described herein provides a transformative, unifying approach for managing system complexity to enable collaborative, global-scale integrative research for accelerating multi-disciplinary scientific discovery. It accomplishes this by abandoning the traditional pipeline/waterfall approach to data-information-knowledge processing. Rather, it prescribes a distributed analytic ecosystem for examining data, communicating information, and discovering, representing, and enriching shared knowledge. The approach begins with the establishment of a conceptual boundary to whatever it is applied. This target system may be a microscopic organism, the human body, a community, a continent, or the planet Earth.

Within a system boundary, data is regarded as a collection of observations about this system. That is, given a complex system S, the (generally unbounded) set of data $D=\{d_1, d_2, d_3, \ldots\}$ contains data about S where each $d_i \in D$ is viewed as a "scientific measurement" of some aspect of S. For example, an element d may be spectral decomposition of a chemical, a gene sequence of an organism, an e-mail message of an individual, the text of community's legal statute, or the seismic motion of a tectonic plate. When viewed in this manner, associated with every datum d is a measurement precision, measurement accuracy, and a frame of reference (e.g. spatial-temporal perspective) in which the measurement was made (i.e. data was collected). These items may be either explicitly stated or implicitly assumed, and may not always be imminently calculable, or perhaps even practically knowable. This treatment, however, is important so that subsequent data collection and analysis about whatever system is being examined rests on a scientific foundation versus simply conjecture or subjectivity.

For a system S, the solution next prescribes the notion of a model M for S. The model M is a knowledge representation of system S, which may likely be time varying and dynamic depending upon the complexity of S. Associated with every model M is an ontology O that formally defines the semantics of all element types of M. To aid complexity reduction, and often as a practical and computational necessity, a model M and its accompanying ontology often represent a simplification of S which may purposefully ignore various characteristics of S that may be deemed irrelevant or of little consequence to the particular line of scientific inquiry.

The solution provides a collaborative approach for building shared representation models for systems of high complexity and large scale. These models are derived by leveraging large, distributed, and heterogeneous data spaces. Specifically, the approach is formulated to enable modeling at global scale, where the complexity of our world with its large number of inhabitants can be captured for a very diverse range of application domains. The solution enables these same techniques to be recursively applied in a hierarchical fashion and then dovetailed, yielding an even broader ecosystem of integrated model components to span multiple levels of abstraction.

Within a particular system S domain, the model M for system S is constructed through an ongoing sequence of observations (i.e. data) and the application of scientific theories (i.e. analytics) about such observations. These theories define a collection of transformation operations $\Gamma = \{\gamma_1, \gamma_2, \gamma_3, \ldots\}$ upon M. In essence, theory operations transform a system model from one state to another. For example, a specific theory $\gamma_\alpha$ might define an initial state based on a particular data subset as in $$\gamma_\alpha(\emptyset, d_i, d_j, d_k, \ldots) \Rightarrow M$$

whereas another theory $\gamma_\beta$ might transform a model's current state into a new state given new data as in $$\gamma_\beta(M, d_i, d_j, d_k, \ldots) \Rightarrow M'.$$

Other theories may transform a model simply based on the value of its current state without involving any data observations, as in $$\gamma_\chi(M) \Rightarrow M'.$$

At an even greater level complexity, a theory $\gamma_\beta$ might transform a model based on models of other systems as in $$\gamma_\beta(M, M_X, M_Y, \ldots) \Rightarrow M'.$$

The solution embraces all of these forms of transformations and many variants.

Given a model M for system S, the solution recognizes that there may exist multiple interpretations of M depending upon the specific domain. The solution thus incorporates the notion of views $W = \{w_1, w_2, w_3, \ldots\}$ where each $w_i \in W$ is created via a function from the set $\Phi = \{\phi_1, \phi_2, \phi_3, \ldots\}$ that contains the various interpretations of M. Each interpretation function $\phi_i \in \Phi$ defines a mapping $\phi_i: M \rightarrow W$ that translates some subset of model M into its respective view of M. The solution imposes no particular mathematical structure on views or their respective interpretation functions. An interpretation of M may produce a view as simple as a range of scalar values or as complex as a multi-dimensional vector space. Alternatively, there may be a need for only one view with M=W and $\Phi$ containing only the identity mapping. The view formalism is provided so that the same system knowledge representation may provide varying perspectives to best support a wide range of end-user applications.

Figure 3:
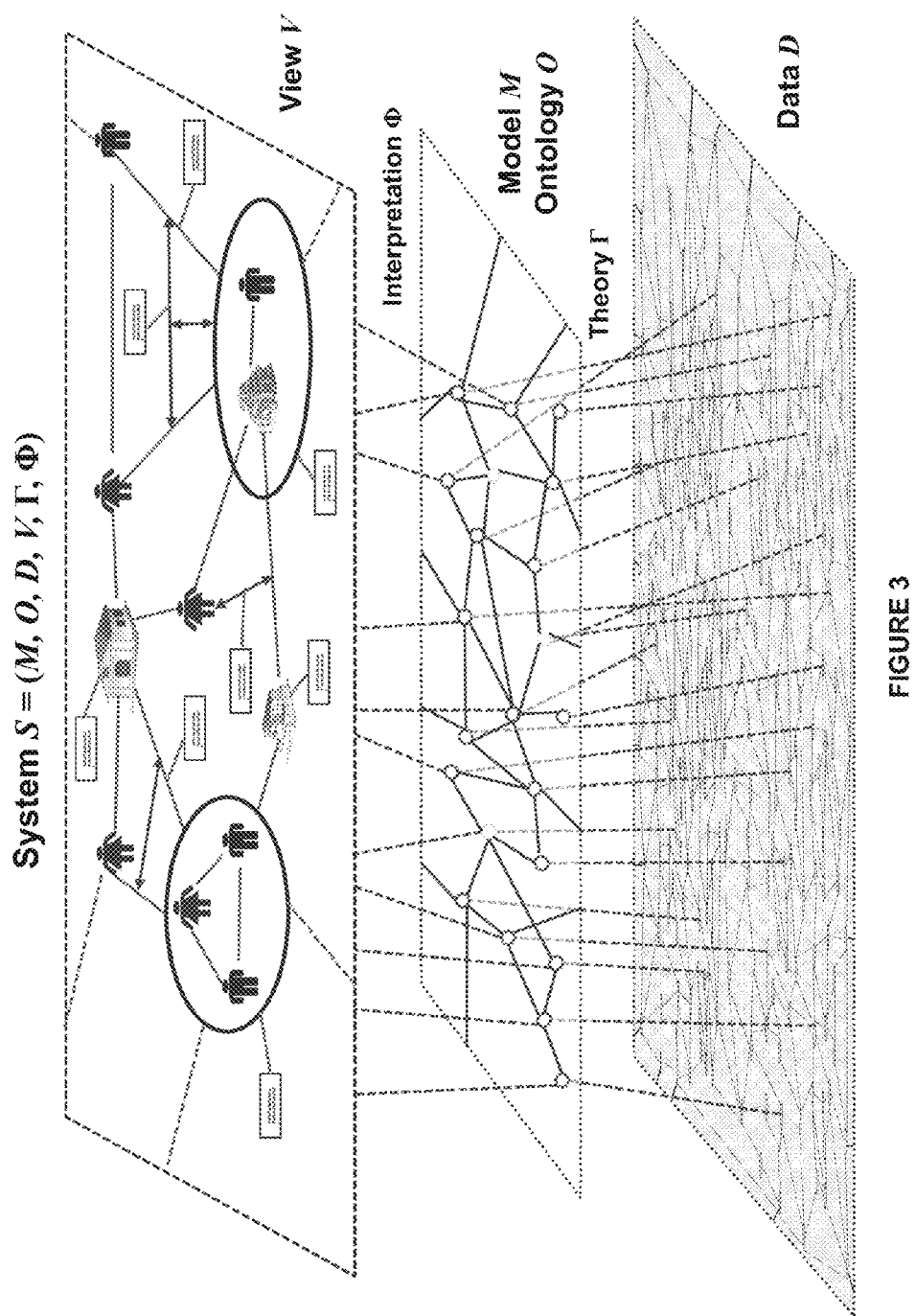
FIG. 3 is a second schematic of the framework described herein to implement preferred embodiments.

The blending of these various concepts is depicted in FIG. 3. The bottom layer of FIG. 3 is a representation of the vast data space D for system S. The middle layer of FIG. 3 contains the system model M created as a result of the theory set $\Gamma$. At the top of FIG. 3 is the view space V created as a result of the interpretation set $\Phi$ that results when applied to model M.

In summary, the solution mathematically portrays a complex system S as the 6-tuple $$S = (M, O, D, W, \Gamma, \Phi).$$

That is, the process solution strives to create a unified model M with ontology O of a complex system S that explains phenomena D via theory $\Gamma$, presenting results W via interpretation $\Phi$. The scientific method provides a mechanism for testing the validity of theory $\Gamma$ and the utility of model M through experimentation, offering an evolutionary (or revolutionary) path to new models, new theories, new interpretations, and thus ultimately new discoveries.

The solution knowledge framework provides a method for constructing and analyzing multi-disciplinary models of large complex systems (e.g. global communication, energy, and transportation infrastructure; world population systems). Given such a system S, the solution prescribes a distributed, collaborative approach for developing, analyzing, maintaining, and applying the resulting model M. To accomplish this, the solution regards the model M as a critical resource sharable amongst all system S research participants. If S is of global scale, then the size of M and/or the number of participants involved may be quite large. In order to represent global-scale systems, the solution enables model sizes on the order of one trillion nodes and one quadrillion links.

Within this framework, the solution characterizes all entities that access the knowledge space as knowledge producers and/or knowledge consumers. The solution uses the term analytic to describe either of these roles. Producers are analytics that enrich the knowledge space through the transformation of data sources. Each of the transformations in the theory set Γ above have a knowledge producer role. In contrast, many end-user applications' needs only consume this knowledge, such as visualization tools, trend analyzers, and alerting functions. Each of the functions in the interpretation set Φ above have a knowledge consumer role. Some analytics may exhibit dual roles, both producing and consuming knowledge. Contextual analytics that perform a model transformation based on input data and existing model state are an example of a dual knowledge consumer/producer. Similarly, 'pure' analytics (i.e. those that interact only with the knowledge space) that produce new knowledge based solely on consumption and theorization of the existing model are another dual example.

Figure 4:
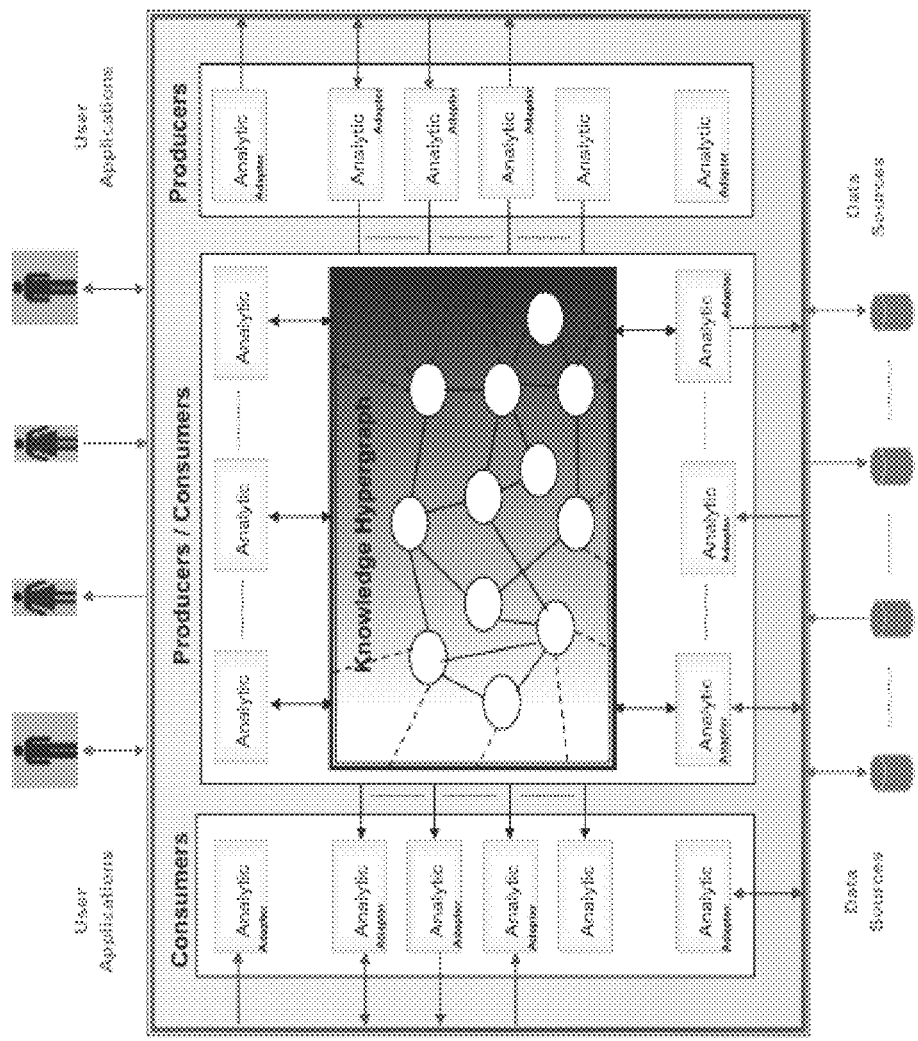
FIG. 4 is a schematic illustrating analytic components of the framework described herein.

FIG. 4 illustrates all the possible combinations of analytic processes and their interactions with external data sources and/or application users. Information flow is depicted via arrow directionality. The solution supports all such types. Note that all analytics that interact with the external environment (e.g. source data systems or visualization components) are labeled as "adapters", a special case of analytic. Analytics are entirely modular, supported in "plug-in" fashion, added and deleted depending upon the knowledge enrichment (production) or knowledge application (consumption) services needed.

At the core of FIG. 4 is the knowledge space for capturing M. To achieve its scalability and application generality, the solution utilizes a hypergraph knowledge representation structure for M. Instances of knowledge concepts (model nodes) and conceptual relationships (model links) are represented as hypergraph vertices and hypergraph edges, respectively. The solution enables information attributes to be attached to any hypergraph element. Using this attribute mechanism, hypergraph elements can be richly annotated with weights, color, or more general name-value attribute pairs. The representation of entity/relationship state vectors may be readily embedded in this structure. This attributed hypergraph structure was specifically chosen as it enables dense representation of the broadest range of complex semantic relationships. Whereas a sizable portion of the current knowledge representation industry is restricted to subject-predicate-object expressions (e.g. RDF triples), the solution's relationship structure enables any number of entities (represented as hypergraph vertices) to be contained in a single relationship (represented as a hypergraph edge).

Figure 5:
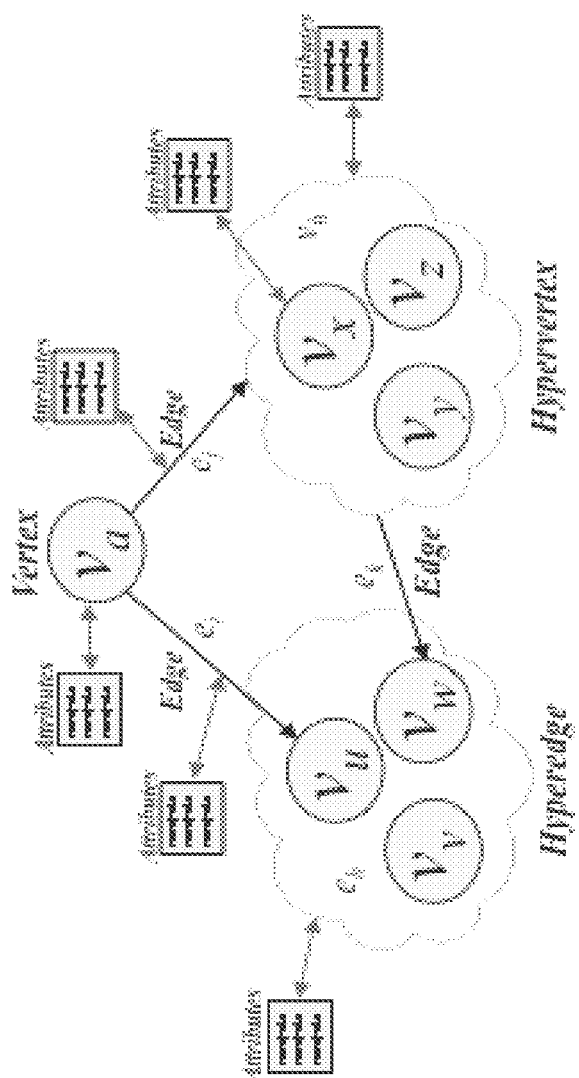
FIG. 5 illustrates hypergraph elements in accordance with the embodiments described herein.

As a further generalization, the solution employs hypergraph element polymorphism enabling hypergraph edges to behave as hypergraph vertices, and hypergraph vertices to behave as hypergraph edges. A depiction of all of the solution's hypergraph elements is shown below in FIG. 5. Using the hypergraph formulation, for example, the family relationship of five people can be represented with five graph vertices (one for each family member) and a single hypergraph edge versus six traditional graph vertices (one for each family member and one special vertex for the family) and five graph member edges. In the solution hypergraph domain, the hypergraph edge representing the family relationship can then in turn be captured as a single hypervertex representation of the aggregate family unit for use in other model relationships. This yields a very compact, simple structure for representing a wide range of complex relationships. This technique can be used recursively to dramatically simplify the conceptual and visual representation of systems with extremely complex interdependencies.

In addition to attributes, the solution also incorporates the notion of events that may be associated with any hypergraph element. Events are used to signal occurrences of various model state transitions and conditions. Analytics can asynchronously publish events on hypergraph elements and similarly asynchronously subscribe to such events. In this manner the production of knowledge by one analytic can trigger the consumption of knowledge by another, yielding the aforementioned ecosystem of analytics, all interacting via the common knowledge model M.

Figure 6:
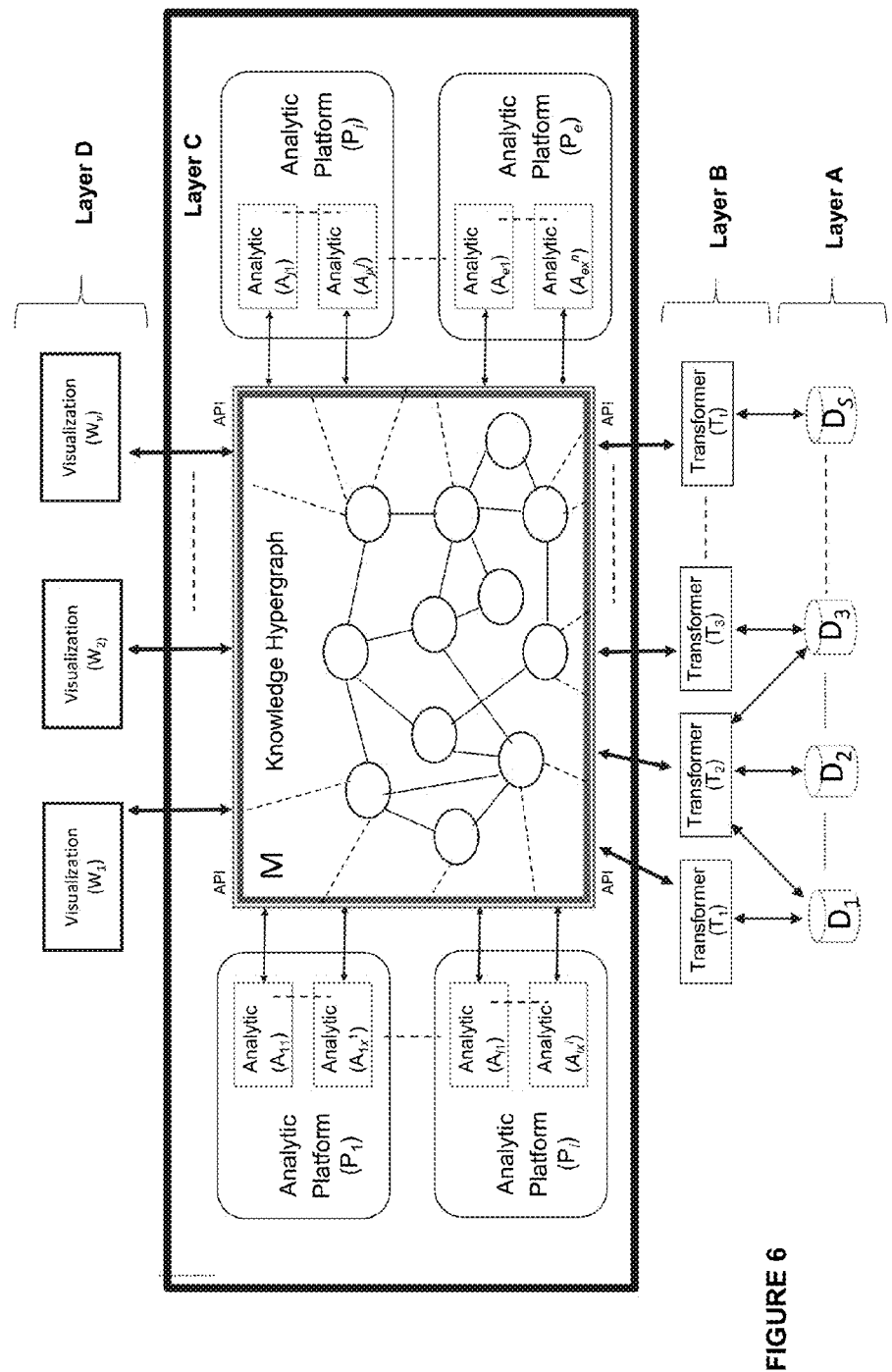
FIG. 6 is a schematic of an architectural framework in accordance with the embodiments described herein.

The main components of the solution framework are shown in FIG. 6. The framework is a four-layer system design. At the heart of this architecture is Layer C containing the knowledge model (M), a very large distributed set of objects that collectively represents the world's physical (and virtual) entities and their relationships. The structure of this space is that of a large attributed hypergraph with the envisioned scale in excess of ~1 trillion vertices, ~1 quadrillion edges. At the bottom of FIG. 6 are the data sources $D_1, D_2, D_3 \ldots$ (i.e. Layer A). The union of all these data sources collectively defines the data space D. It is assumed that the number of such sources is substantial (i.e. thousands) and that sources are typically heterogeneous, encompassing diverse data structures and format ranging from fixed flat files to real-time streaming flows, both structured and unstructured.

Upon Layer A is a set of data source transformations $T=T_1, T_2, T_3, \ldots$ that comprise the Layer B. The role of each Layer B transformation is to continuously extract entity/relationship state information from each data source and update the hypergraph knowledge model M managed by Layer C above. Each transformation implements one or more theories from the theory set Γ. Access to the knowledge hypergraph is provided via an open, standardized Application Programming Interface (API). Surrounding the knowledge hypergraph are a set of analytic platforms $P_1, P_2, P_3, \ldots$. An analytic platform is a compute engine specifically designed to accelerate certain classes of analytic algorithms (e.g. graph-based, relational-based, table-based, statistical-based, etc.). Each analytic platform $P_i$ hosts a set of analytics $A_{i1}, A_{i2}, A_{i3}, \ldots$ that interact with the knowledge hypergraph via the common API. The Layer B transformations are considered a special case of analytic (i.e. adapters) that interface directly to one or more data sources. Each transformation $T_i$ is hosted on some analytic engine P, sharable with other analytics.

At the top of FIG. 6 is a collection of views $W_1, W_2, W_3, \ldots$ (Layer D). The union of all such views collectively defines the view space W. Each view is implemented via one or more mapping functions from the interpretation set Φ. Views are again considered a special case of analytic that interfaces to one or more users or user applications. Views are similarly hosted on an analytic engine, sharable with other analytics. Views enable researchers to monitor model changes in real time from several different perspectives. This is of critical importance when working to understand the dynamics of many real-world systems (e.g. critical infrastructure, cyberspace). All views access the Layer C knowledge hypergraph using the same API as all other analytics. Hence, the power of the solution hinges heavily upon this API. Envisioned are API bindings specified in all of the leading programming languages (e.g. Java, C++, Python, Ruby, Perl) and analytic tools (e.g. R, SAS, MATLAB). This API defines a simple set of general, core primitives, engineered specifically for global scalability and proof-of-correctness. These primitives allow a client (i.e. an analytic) to connect to the knowledge model, create and delete hypergraph elements, invoke their methods, and asynchronously publish and subscribe to events. In addition, these primitives enable a very robust form of knowledge space isolation in support of privacy enforcement and cyber security.

The solution recognizes that no single platform (i.e. analytic engine) is ideal for all classes of analytics and that performance can vary as much as six orders of magnitude (e.g. Semantic Web versus in-memory graph traversal). The preferred solution imposes only one formal API specification that is identical across all components to ensure a high degree of analytic interoperability and portability. The specific implementation of this API internal (i.e. its body), however, can vary considerably across platforms. By enabling implementation internals to be tuned from platform to platform, the solution is able to better exploit the specific computational/performance features of each. This tuning involves the degree of hypergraph caching and pre-caching that must be performed. For example, on a very large shared memory machine, large segments of the hypergraph can be pre-loaded into main memory to yield near constant time graph traversals. For global search applications, however, a parallel map-reduce infrastructure may be more effective. Similarly, for transaction oriented analytic operations, a columnar or conventional database platform may be more ideal. The solution enables these platforms to be mixed and matched to better balance costs and performance while preserving analytic design investment.

By way of specific and representative example, an infrastructure implemented in accordance with one or more embodiments described herein protects infrastructure API, Server and Adaptors using SAML 2 Service Providers (SP) using Enhanced Client or Proxy (ECP). The SAML 2 specification defines a profile of usage known as ECP, which extends the capabilities of the standard web Single Sign On (SSO) profile to HTTP user agents which are more advanced than simple web browsers. An ECP user agent is aware of and actively participates in the SAML flow between the Service Provider (SP) protecting a resource and the Identity Provider (IdP) providing authentication and attribute assertions about the subject invoking the user agent.

Infrastructure API clients accessing the knowledge-share infrastructure use the ECP profile to authenticate to the knowledge-share infrastructure Server and Adaptors. The advantages of this approach are twofold: 1) Users will be able to access (potentially widely distributed) knowledge-share infrastructure API services by authenticating with their existing home institution credentials, avoiding the need to build identity and credential management into the system, and 2) API endpoints will be able to protect their services by leveraging the (potentially rich) set of user attribute information made available by the user's IdP and exposed by the service's SP. This enables data owners to impose whatever fine-grained access control they desire or their data collection restrictions mandate. For example, a first institution can allow a particular researcher from a second institution to access the first institution's data, without having to give access to all of the first institution's data to all researchers at the second institution.

Many United States higher education and research institutions already support SAML federated authentication via existing SAML infrastructure (e.g. via Shibboleth) as well as membership in the InCommon Federation. All currently supported versions of both the Shibboleth IdP and SP support the ECP profile out-of-the-box. Only additional, minimal authentication configuration is required to support the use of the ECP profile with the Shibboleth IdP. The InCommon Federation will serve to establish the trust fabric between the SP's protecting knowledge-share infrastructure services and the home institution IdP's providing user identity assertions. The use of Shibboleth, SAML and InCommon will allow the knowledge-share infrastructure to leverage existing trust relationships and technical infrastructure to provide proven authentication services.

The solution embraces two quantitative metrics for comparing progress and effectiveness. As defined above, first is the notion of knowledge density that characterizes the connectedness of the hypergraph. The second is the notion of analytic yield that characterizes the number of computational inferences that are possible over a given hypergraph implementation.

Figure 7:
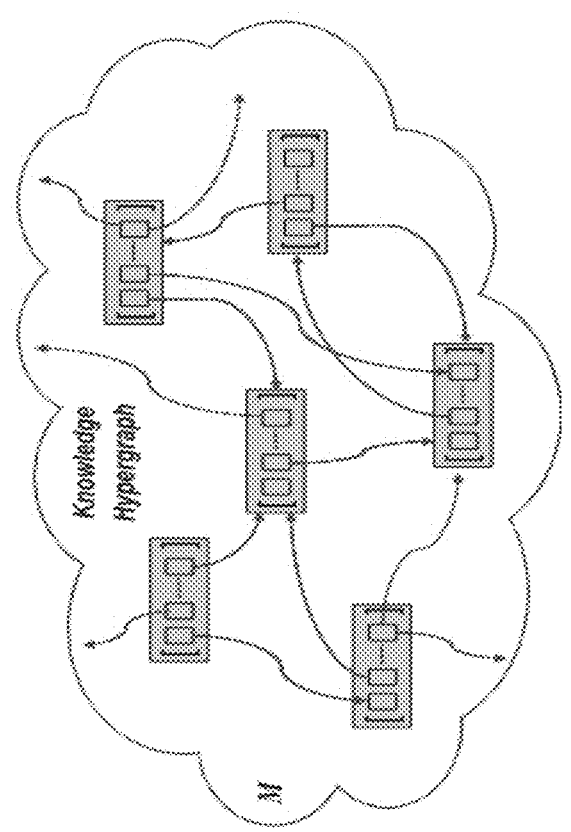
FIG. 7 is a hypergraph virtual representation in accordance with the embodiments described herein.

The knowledge hypergraph is implemented using a distributed overlay approach. That is, the hypergraph need not ever be instantiated in any one physical location or on any one computational platform. From an analytics' perspective, the hypergraph appears as a large virtual cloud of interconnected hypervertices and hyperedges, each representing some aspect of an accompanying model M for a system S. This is depicted in FIG. 7.

Figure 8:
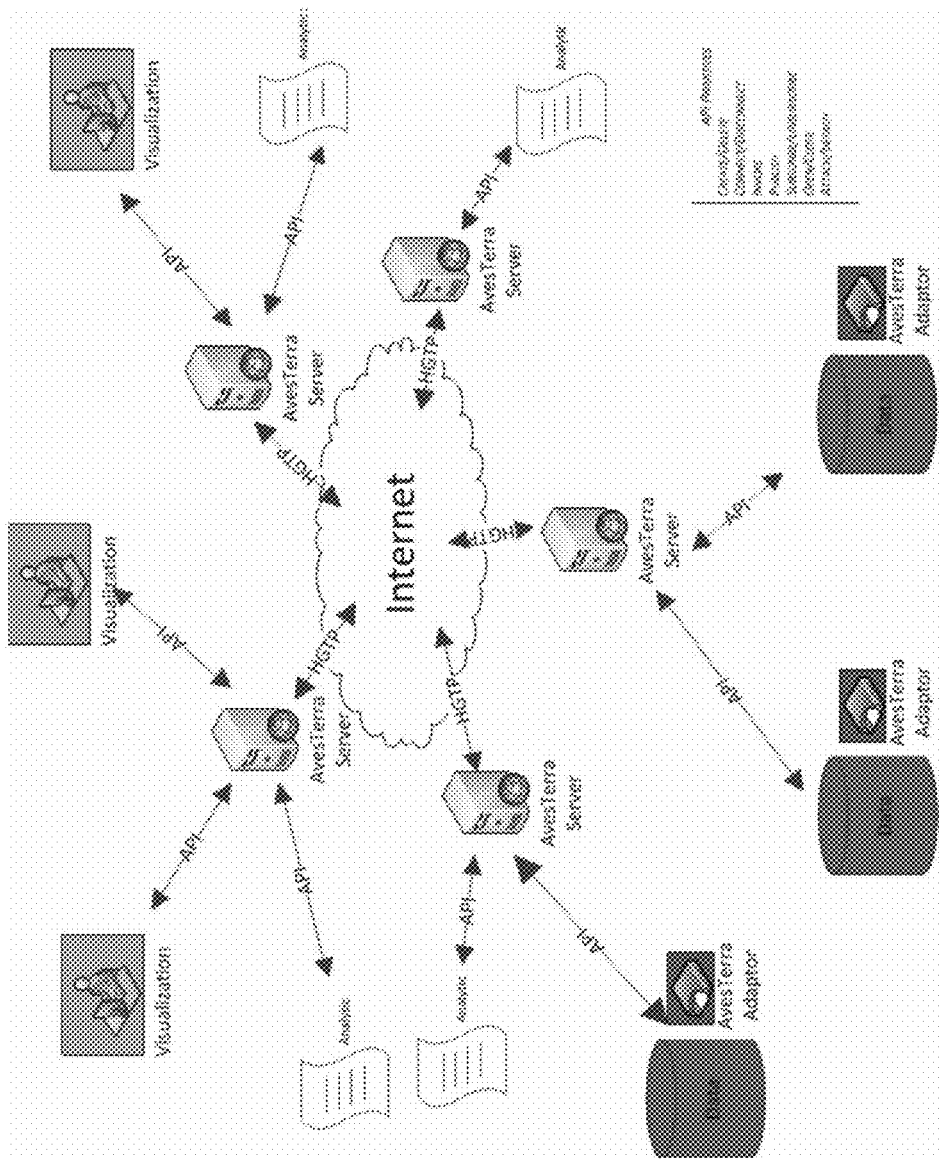
FIG. 8 a hypergraph physical instantiation schematic in accordance with the embodiments described herein.

The hypergraph physically exists, however, as a result of interconnected servers communicating in peer-to-peer fashion using a common hypergraph transfer protocol (HGTP). Every analytic, regardless of its role as a data adapter, knowledge transformer, or view application, interacts as a client with one or more of these servers, as shown in FIG. 8. Just as the World-Wide Web manifests as a result of globally distributed web servers communicating via HTTP, the hypergraph manifests as a result of globally distributed hypergraph servers communicating via HGTP. Analogous to the web presenting users with an interlinked view of content, the solution presents researchers with a hyperlinked model of a complex system's entities and relationships with affixed attributes and methods. Unlike the web, however, the hypergraph model is not intended for human-readable access. Rather, it is a knowledge representation intended for machine-readable access by computational analytics.

To create the knowledge hypergraph, adapters attached as clients to their respective servers make requests of the server to create an entity in the knowledge space, and specify how the entity behaviors are to be fulfilled. This fulfillment process involves making a logical connection between the entity in the knowledge space, and the adapter that will respond to any requests upon it. That is, when any client attached to the knowledge space makes a request of the entity, the request is forwarded to the adapter that created it. The adapter interprets the request and generates any necessary response. In the knowledge hypergraph, adapters behave as plug-ins connected via the standardized API, akin to the Common Gateway Interface (CGI) associated with web servers.

The standardized API enables entities to be attached as attributes to other entities in a generalized way, with the adapters performing the majority of work. When a client requests an entity attribute, or "invokes" an entity's method, the request is routed to the proper adapter to fulfill. Fulfillment might involve a simple value lookup, a database transaction, or execution of a command and control sequence depending entirely on the adapter implementation. This structure is general and expressive. For it to work, all entities in the knowledge space have a universally unique identifier (UUID) that differentiates it from all others. In an exemplary embodiment, hypergraph elements are identified by a 128-bit UUID, akin to a machine-encoded version of a World Wide Web Universal Resource Identifier (URI). To eliminate an extra table mapping, embedded within this UUID is sufficient routing information to locate the original system where the element was created and persisted. For example, the top 64-bits may be reserved for the HGTP server address, and the lower 64-bit reserved for the specific hypergraph element maintained by that server.

In addition to the basic request fulfillment primitives, the API also specifies operations for event publication and subscription. This capability provides analytics with asynchronous notifications of changes in the knowledge space. In all, the API defines 11 basic primitives, including:

CREATE—Creates entity in the knowledge space: (uuid, parameters, authorization) ⇒ status
DELETE—Deletes entity from the knowledge space: (uuid, parameters, authorization) ⇒ status
CONNECT—Connects entity to an adapter: (uuid, adapter, authorization) ⇒ status
DISCONNECT—Disconnects entity from an adapter: (uuid, adapter, authorization) ⇒ status
INVOKE—Invokes entity's method: (uuid, method, parameters, authorization) ⇒ status PUBLISH—Publishes an entity event: (uuid, event, parameters, authorization) ⇒ status
SUBSCRIBE—Subscribes to entity event: (uuid, event, parameters, authorization) ⇒ status
OPEN—Opens a knowledge space notification outlet: (uuid, authorization) ⇒ status
CLOSE—Closes a knowledge space notification outlet: (uuid, authorization) ⇒ status
ATTACH—Attaches analytic to notification outlet: (uuid, event, parameters, authorization) ⇒ status
DETACH—Detaches analytic from notification outlet: (uuid, event, parameters, authorization) ⇒ status Each of the primitives can be accessed by an analytic via the same standardized system-wide API. Depending upon their role, analytics request these primitives in order to, e.g., create and delete elements in the hypergraph, to invoke operations on these elements, and to request notification of events. Construction of a hypergraph element begins with execution of a CREATE primitive by an analytic. The HGTP server processing this request allocates a universally unique identifier (UUID) for this new element in the knowledge space. In addition, the server records which of its analytics is attached to this element. The DELETE primitive permanently detaches an element from analytic and permanently removes it from the hypergraph space. As currently envisioned, hypergraph elements are identified by a 128-bit UUID, akin to a machine-encoded version of a World Wide Web Universal Resource Identifier (URI). To eliminate an extra table mapping, embedded within this UUID is sufficient routing information to locate the original system where the element was created and persisted. For example, the top 64-bits may be reserved for the HGTP server address, and the lower 64-bit reserved for the specific hypergraph element maintained by that server.

Leveraging existing Internet web tradecraft, HGTP servers may be single processes that manage only a small number of hypergraph elements, or a collection of mirrored clusters that manage many hypergraph elements. The API specification for the CREATE and DELETE primitives is summarized as follows:

CREATE(uuid,{authorization})=>status;

DELETE(uuid,{authorization})=>status;

When created, the HGTP server records the hypergraph element UUID in an internally persisted table. Included in this table is a local identifier for the analytic that created the element. This is needed so that the server knows how to forward HGTP requests to the correct analytic. Analytics that create (produce) hypergraph elements are distinguished as adapters. That is, they perform the mathematical process of transforming (adapting) the knowledge hypergraph model M based on their input data $d \subseteq D$ from an external source. Adapter analytics are what define and give hypergraph elements their behavior. These behaviors are accessible by other analytics in the ecosystem via the INVOKE primitive. This primitive accepts a hypergraph element UUID as its primary argument, followed by the "method" identifier to be invoked for that object. This method invocation mechanism is how the solution implements its hypergraph operations. Via this primitive, adapters can be instructed to add and delete hypergraph entities and relationships, add and delete attributes, examine attributes and adjacencies, and traverse edges. The execution of these instructions is defined and controlled entirely by the analytic with no centralized management thus required. The API specification for the INVOKE primitive is summarized as follows:

INVOKE(uuid,method,{parameters, authorization})=>status;

By way of particular example, Georgetown University's Sapien database maintains a statistical representation of the Earth's entire human population. Via an adapter, each person in Sapien appears as a unique entity in the knowledge space. To obtain information about a specific Sapien individual, a client performs an INVOKE operation on that entity, specifying the necessary set of parameters. For instance, to obtain the statistical age of a person x, the following operations would have to occur:

INVOKE(person_x,age)=>(value)

Through the API, the client sends an INVOKE message to the server with the UUID person_x and an encoding that specifies the "age" attribute. A typical response contains a value for the requested information. Other parameters might include name, location, gender, demographics, etc. Other response types can include single values (e.g. temperature), sets of values (e.g. flow rate profile), or sets of other entities (e.g. a social network). The ontology provides the common understanding of the entity classes and the meanings and permissible ranges and units for the attributes.

Assuming a simplified security/privacy scheme initially, any analytic in the solution ecosystem can access any hypergraph element's methods, provided it knows the element's UUID, the method's identifier, and the method's parameters. Methods and associated parameters, however, may vary considerably from one hypergraph element type to another. The solution provides a common hypergraph "tool kit" for use by all analytics. This tool kit provides support for common operations such as inquiry of an element's ontologic type (e.g. person, place, thing), and a reflection of all its supported methods. When an analytic wishes to invoke a particular hypergraph element's method, it forwards the UUID of the element, the method identifier, and the method parameters to its local HGTP server via the common API. The HGTP server packages these items into an HGTP message and forwards the message to the appropriate HGTP server responsible for managing that hypergraph element based on its UUID. At the receiving end, the remote HGTP sever un-packages the HGTP message and relays its contents to the appropriate analytic that is attached to the hypergraph element. If the remote analytic is able and willing to execute the method, it performs the operation, returning the result via its respective server to be relayed back to the originating analytic. In this manner, all analytics can access hypergraph elements and all their operations using the same identical API from anywhere within a solution enterprise.

The proposed toolkit creates a software stack upon the API for greater simplicity, expedited development and implementation ease. Similar to the API, this toolkit will be bound to leading programming languages and analytic tools, prioritized by requirements. Included in this toolkit are resources for creating and managing common hypergraph design patterns, and persisting these structures in hypergraph entity registries for rapid indexing and search. The intent of the toolkit is to alleviate analytic developers of tedium that might otherwise be associated with direct API/HGTP access.

The solution hypergraph is a dynamic structure with continuous real-time enrichment anticipated. As a consequence, scalable and efficient operators are needed to perform hypergraph modifications. The toolkit is to include four types of basic update operators: Insertion of a new (hyper) vertex into the hypergraph; Deletion of an existing (hyper) vertex from the hypergraph; Insertion of a new (hyper)edge into the hypergraph; Deletion of an existing (hyper)edge from the hypergraph; Modification of an existing (hyper) edge in the hypergraph.

These tasks are quite involved. For instance, in the case of deletion of an existing hypergraph vertex, all hyperedges that are associated with the vertex must be found and deleted as well. Likewise, as all of the operations on the hypergraph are built on top of various index structures, the algorithms to implement these operations traverse and update the index structures. For example, modification of an edge may be viewed as a combination of insertion and deletion—but it is often much more efficient to automatically implement as a single modification operator.

The PUBLISH and SUBSCRIBE primitives are used for asynchronous notification of events that can occur on hypergraph elements. Events may be triggered (published) automatically by a hypergraph element's analytic (adapter) when it detects certain element state changes (e.g. an attribute value update). Or, events may be triggered manually by an analytic that requests a PUBLISH operation. Both operations accept a hypergraph element UUID and an event identifier as parameters. The SUBSCRIBE primitive is used by an analytic when it needs to be asynchronously notified of specific hypergraph element state changes. Each HGTP server is responsible for maintaining event queues for each of the hypergraph elements that it supports. Notification of an event publication is envisioned via a call-back construct particular to whatever analytic programming environment that employed (e.g. Java, C++, Python, Ruby, Pearl, R, SAS), etc. The API specification for the PUBLISH and SUBSCRIBE primitives is summarized as follows:

PUBLISH(uuid,event{authorization})=>status;

SUBSCRIBE(uuid,event,{authorization})=>status;

Two additional primitives (CONNECT and DISCONNECT) may also be incorporated in a solution embodiment to allow multiple analytics to be attached to a single hypergraph element. This is particularly helpful for creating inheritance structures and collaborative enrichment processes.

And, finally, the OPEN primitive opens a knowledge space notification outlet: (uuid, authorization)$\Rightarrow$status, while the CLOSE primitive closes a knowledge space notification outlet: (uuid, authorization)$\Rightarrow$status. And the ATTACH primitive attaches an analytic to a notification outlet: (uuid, event, parameters, authorization)$\Rightarrow$status, while the DETACH primitive detaches an analytic from a notification outlet: (uuid, event, parameters, authorization) $\Rightarrow$status.

The resulting framework is generic and highly scalable. To apply this framework, an ontology must first be selected in unison with the definition of model M. The solution is ontologically neutral, imposing no particular semantic relationship hierarchy. The solution does, however, prescribe that the ontology's concept types and conceptual relationship types are selected so that instance discovery will conform to an asymptotic information curve versus an exponential data curve. This is to prevent the hypergraph size from exploding beyond calculable limits. As mentioned, the solution model size design goal is on the order of trillion-node/quadrillion-link scale. This is adequate to represent a large array of complex globally interconnected systems (e.g. population, energy, food, transportation, communications). In contrast, representing specific system data measurements (observations) such as individual's e-mail messages, temperature/pressure readings, object displacements, chemical reactions, etc. as nodes within the model would be problematic as there exists no natural constraint to their upper bound. As these items would likely follow a data exponential growth profile, they are best handled as computed state vectors attached as attributes to hypergraph elements (via the theory set $\Gamma$) versus direct vertex/edge representation.

In simple terms, the solution advocates that hypergraph vertices and edges represent observable objects in the physical-world versus measurements of phenomena. Measurements are used to attribute hypergraph model elements via the application of theories regarding the observed phenomena. Thus, the solution is well suited for analysis of complex systems that contain large numbers of highly interdependent components that can each be characterized and differentiated through a generalized state vector.

The solution is applicable to very diverse scientific use cases. For example, it is equally applicable to societal resiliency and humanitarian informatics. The resiliency use case focuses on the resources and economics required to sustain communities through a plethora of threats, pressures, and constraints including natural disaster, emergency crisis, terrorist attack, climate change, energy food supply disruption, and communication failures. The model components (hypergraph elements) of such systems involve people, roads, communication infrastructure, facilities, organizations, communities, cities, etc. The second use case focuses on individuals, helping to predict and mitigate their displacement due to natural disaster, political unrest, humanitarian crisis, climate change, and economic collapse. The model components of such systems involve people, families, neighborhoods, relief organizations, regional climate, energy and food supply, political and economic structures. While these two use cases have dramatically different purposes, the models involved have significant overlap, particularly at increasing global scale. The solution described herein recognizes that multi-disciplinary domains greatly benefit from sharing and collaborative development (i.e. increased knowledge density/analytic yield). The global scalability of the knowledge hypergraph is critical for this purpose.

The expressive power of hypergraph structures is enormous; requiring, at base, powerful, general-purpose, reusable hypergraph analytics. In a preferred solution, the hypergraph analytics have a "plug-in" type structure that enables further contributions from the open community. This structure is intended to welcome both open source and proprietary analytics into the solution environment in order to leverage the best analytic capabilities available.

Among the core analytic services provided by the solution hypergraph is the ability to search and discover patterns in large hypergraph structures. Using this capability, researchers will be able to define patterns of interest to them, search for these patterns in any hypergraph maintained by the solution, and find all possible answers. For example, a researcher working with a hypergraph of the entire population of Somalia may require several labeled hyperedge types. One hyperedge may include all members of the Hiraab tribe—if this set of individuals is S1, then the labeled hyperedge would be (S1,Hiraab). Likewise, another hyperedge might describe the set S2 of all residents of the town of Kismayo. In this case, the labeled hyperedge would be (S2,Kismayo-residents). Likewise, if there are direct connections (e.g. a "linked_with" edge between two individuals x and y), then the hypergraph would have the hyperedge ({x,y},linked_with) between them.

Figure 9:
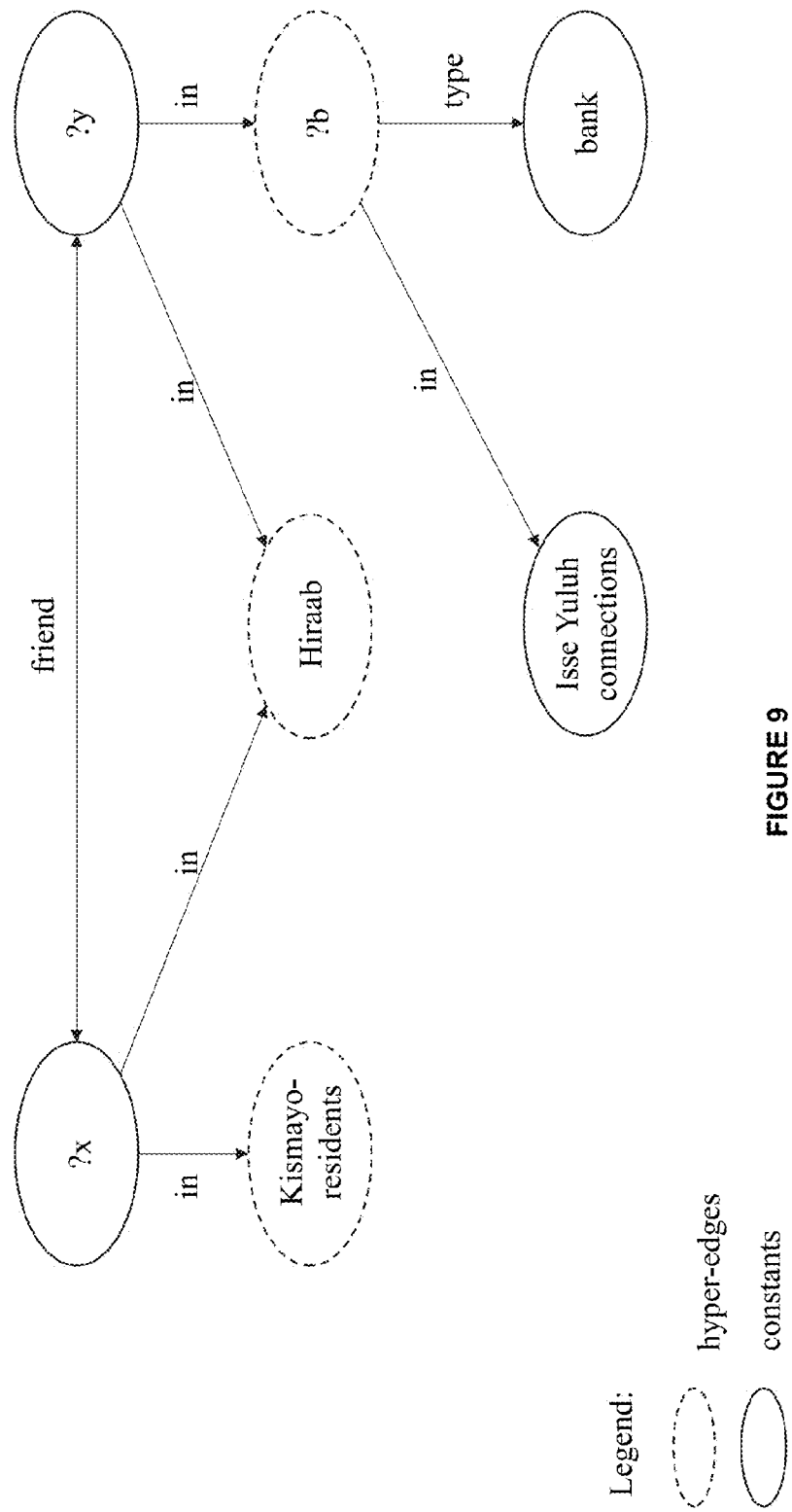
FIG. 9 is a sample hypergraph query in accordance with the embodiments described herein.

FIG. 9 provides a simple example of a query that a researcher may want to ask. In this case, the query is to find all people ?x who are members of the Hiraab sub-clan and who also live in Kismayo and who are a friend of a person ?y who works for a bank ?b that is linked to Isse Yuluh (a well-known pirate commander in the area).

In this sample query, hyperedges (HE) include, e.g. Kismayo-residents, Hiraab and ?b. The example also includes traditional edges TE (a special case of a hyperedge) such as the "friend" edges and "type" edges shown above.

The toolkit includes a query structure over an hypergraph G=(V,H) where V is a set of vertices and H is a finite set of hyperedges (HE) (subsets of V). Hypergraph queries are thus themselves graphs in which hyperedges (HE) in H can be nodes. Alternatively, nodes can be members of V or even variables such as ?x, ?y and ?b. The toolkit includes a defined labeled hypergraph query language (LHQL) which can express many of the types of queries that researchers are interested in asking. Hypergraph partitioning methods are used to answer LHQL queries efficiently; even against large labeled hypergraphs. The LHQL analytic module is integrated into the framework with hypergraph API access. The toolkit also includes an index structure to split H into "bite-sized" manageable pieces.

Figure 10:
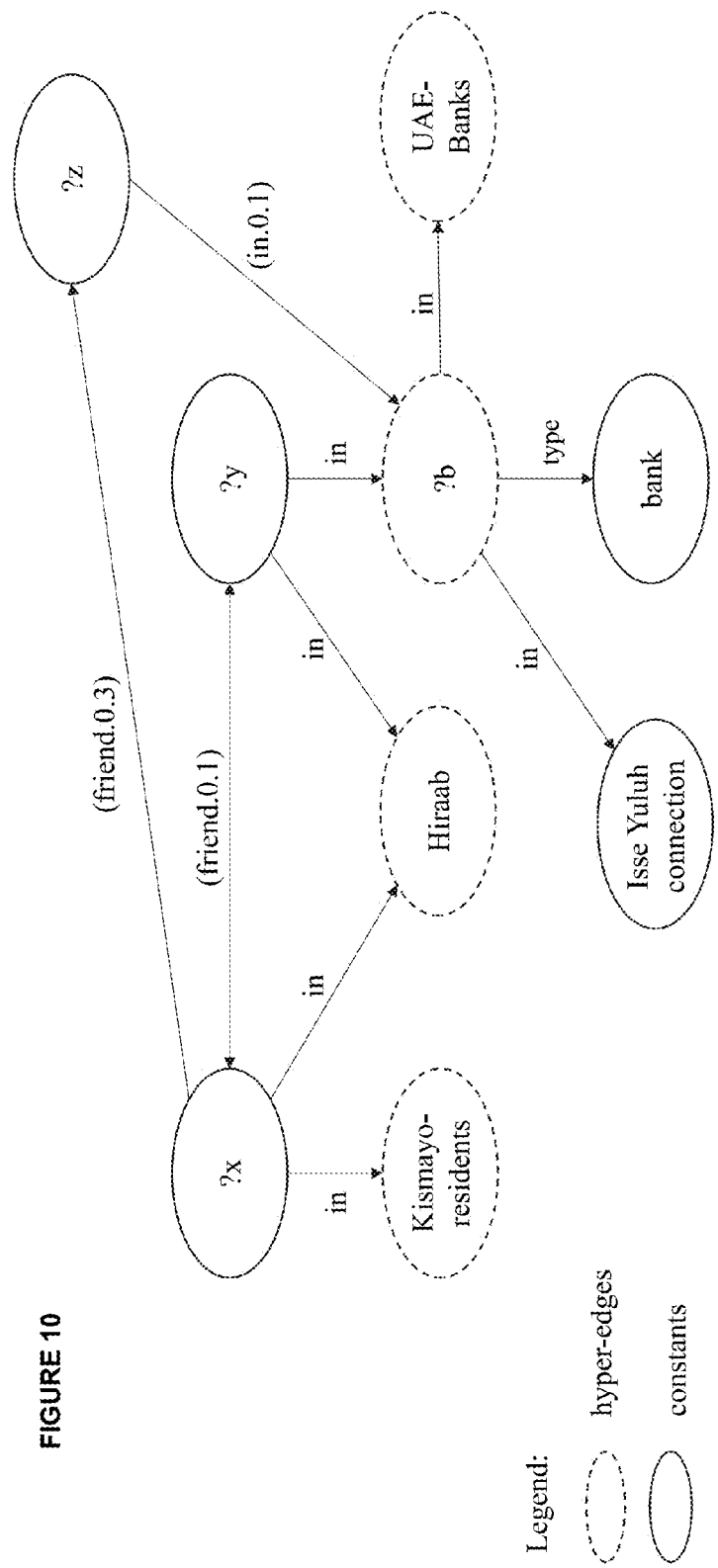
FIG. 10 is a sample probabilistic hypergraph query in accordance with the embodiments described herein.

The toolkit includes a hypergraph probabilistic pattern detection analytic for detecting probabilistic patterns in huge hypergraph structures. In many real world applications, researchers are not entirely certain of what it is they need. For example, consider FIG. 10. In FIG. 10, a researcher is ideally looking for a person ?x who satisfies numerous constraints, but is also willing to consider people satisfying only a subset of these constraints.

FIG. 10 illustrates a scenario where the researcher is looking for a person ?x who, in addition to the constraints expressed in the query of FIG. 9, also wants ?x to be a friend of an additional person ?z who is also connected to bank ?b which, additionally, is now required to be in the UAE (United Arab Emirates). However, the researcher is aware that the hypergraph may not only contain people who satisfy all the conditions that ?x is required to satisfy, but also many people who satisfy most but not all of the conditions expressed in FIG. 10. The researcher may wish to take a look at some of these people as well as they too might be suspicious.

The researcher can accomplish this by specifying a penalty in the query. These penalties are shown along the edges of FIG. 10. For instance, a potential candidate (say Joe) for ?x might lose 0.3 (from a perfect score of 1) if he does not satisfy the constraint of being a friend of ?z—in contrast, not being a friend of ?y would cost him a higher penalty of 0.3 from the perfect score of 1. Simply put, what the researcher is specifying is the importance of each query constraint.

Another complication is the penalty of small mismatches. For instance, in the query of FIG. 10, ?b is required to be connected to Isse Yuluh, but in the hypergraph H, there may be an individual called Issa Yuluh but not Isse Yuluh. An exact match between words would disregard this node but in fact, these may be alternative spellings of each other. This approach assumes the existence of a function sim that measures the similarity between two node label attributes. The preference then is to define the quality of a match between a query graph and a subgraph of a hypergraph G. Such a quality function must be: Monotonic with respect to a function sim that measures similarity of node labels and anti-monotonic with respect to the sum of the penalties of unsatisfied edge constraints in the query.

Once these criteria are defined, it is then possible to develop better index structures to answer uncertain queries to hypergraph databases and query processing algorithms to effectively answer such queries. Thus, the toolkit also includes a defined uncertain labeled hypergraph query language (u-LHQL) which will extend LHQL to account for uncertainty in an analyst's query. Given a similarity function sim measuring the similarities between node labels, one in the hypergraph database, and one in the query, functions may be developed to measure the quality of a match between a query graph and a subgraph of the hypergraph database. And methods may be developed to answer u-LHQL queries by finding the top-K (in terms of quality) matches. The u-LHQL analytic module is integrated into the framework with hypergraph API access.

The toolkit further includes a hypergraph sentiment pattern detection analytic. In many diverse surveillance activities (e.g. examination of email of foreign nationals done by NSA), analysts are often seeking to understand the sentiments expressed by a person in those emails. For instance, in the example from Somalia, understanding the attitudes of different individuals towards Isse Yuluh may be quite critical in measuring his base of support and identifying his vulnerabilities.

Given a set T of topics of interest and a hypergraph G=(V,H), a sentiment-hypergraph is a partial mapping $\sigma: T \times (V \cup H) \rightarrow [-1, +1]$. Intuitively, given a topic t and either a vertex or a hyperedge in the graph, the function $\sigma(t, e)$ returns a number between $-1$ and $+1$ denoting the intensity of the sentiment expressed by that vertex (or the set of vertices if e is a hyperedge) on the topic t. A score of $\sigma(t, e) = -1$ describes the case when the sentiment of the set e of entities is maximally negative, while a score of +1 denotes the most positive case. A score of 0 denotes complete neutrality.

For example, a person Ali in the hypergraph may have the score $\sigma(\text{Isse Yuluh, Ali}) = -0.6$ suggesting that from Ali's emails, it can be deduced that he has a fairly strong negative sentiment towards Isse Yuluh. On the other hand, the sentiment of a group of individuals (i.e. a hyperedge) can also be measured. For instance, in examples in FIGS. 9 and 10, Hiraab is a hypergraph consisting of the set of all individuals belonging to the Hiraab sub-clan. It may turn out that the score σ(Isse Yuluh, Hiraab)=0.3, suggesting that as a whole, the Hiraab sub-clan is quite positively disposed towards Isse Yuluh. Thus, each node in the hypergraph, as well as each edge in the hypergraph, is regarded as labeled with an assortment of sentiment tags, one for each topic of interest to the researcher or the application built atop of the solution.

Using sentiment hypergraphs, researchers will be able to pose hypergraph queries that involve assessing the sentiment of individuals and organizations. For instance, returning to the query in FIG. 9, an analyst might wish to extend that query to find all people ?x who are members of the Hiraab sub-clan and who also live in Kismayo and who is a friend of a person ?y who works for a bank ?b that is linked to Isse Yuluh—but additionally look for ?x to be positively viewed by the Hiraab (with sentiment score over 0.6) and who views Isse Yuluh negatively (with sentiment score below −0.4). These latter two requirements can be viewed as the additional constraints σ(?x, Hiraab)>0.6 & σ(Isse Yuluh, ?x)<−0.4. Thus, the toolkit also includes a defined sentiment hypergraph query language (SHQL) which will extend LHQL to account for, e.g., score, sentiment. The SHQL may leverage Sentimetrix's SentiGrade technology. The SHQL analytic module is integrated into the framework with hypergraph API access.

The toolkit further includes a hypergraph anomaly detection analytic, including algorithms and processing to identify semantic anomalies in massive hypergraphs. For example, consider the sample Somali scenario above and suppose an agency such as NSA is monitoring communications of foreign nationals based in Somalia. They notice that the Hiraab sub-clan is generally positive toward Isse Yuluh. But they also note that there are various small subsets $C_1$, $C_2$, . . . , $C_m$ of individuals in the Hiraab clan who are opposed to Isse Yuluh—and in fact, each of the $C_i$'s is also tightly knit as well in the sense that individuals within each of these clusters largely like each other. US interests may suggest a means to consolidate these disparate groups into one group that forms a more potent opposition to Isse Yuluh. In order to achieve this, the ability to identify such anomalous groups is needed.

A semantic anomaly with respect to a hypergraph database G=(V,H) is a finite set C of vertices such that some semantic property with respect to C is anomalous. For instance, in our example above, the semantic property is a variation of sentiment toward Isse Yuluh when compared with the sentiment of the Hiraab sub-clan. This variation may, for instance, be defined as being 3 standard deviations or more below the mean sentiment towards Isse Yuluh amongst the Hiraab. However, in this case, it is also noted that some constraints are imposed, namely that C must have negative sentiment toward Isse Yuluh, and that C's sentiment is compared with the Hiraab. Such constraints come from a research analyst.

The algorithms can identify anomalous sets C of vertices in a hypergraph database that satisfy various analyst specified constraints. Each such anomalous set will have a defined anomaly score. For instance, an anomaly score in the above example might be the number of standard deviations below the mean that the sentiment of a given candidate C is relative to the sentiment of the Hiraab as a whole. The algorithms find the top K most anomalous subsets of vertices. The anomaly detection analytic includes a language and interface through which a researcher can specify the kinds of anomalies being sought; a scoring model for characterizing anomalous node structures; and an algorithm to find the k most anomalous subsets of nodes that satisfy the researcher's constraints.

Hypergraph utility and ease of use is improved with an algebra for expressing hypergraph queries. The algebra may be an extension of the relational algebra common for today's data systems, but applied to the present solution's distributed/attributed hypergraph structure. Included is a set of algebraic operators that allow an analyst to search, query, and otherwise manipulate the knowledge hypergraph. This task will provide a query capability for executing these algebraic expressions. Specifically, the hypergraph algebra is developed upon consideration of the following aspects.

Query Equivalences:

Given any two operations described in the preceding sections, do these operations commute, i.e. can the order in which these two operations are executed be interchanged? If not, are there specific conditions under which such an interchange of order is possible?

Query Costing:

Given an algebraic query in SHQL, how can the expected run time of the query be estimated? What query and data statistics need to be maintained to make this possible? This effort will leverage the past work by the authors on query costing in heterogeneous environments for this purpose.

Query Rewriting:

Given a query (algebraic expression) in SHQL, is there a way to automatically rewrite the query, taking into account the equivalences established above, so as to reduce the expected cost substantially?

Equipped with the hypergraph API, toolkit, algebra, query language, and the analytic tool suite, researchers will be presented with a rich and powerful set of resources with which to design, implement, and integrate analytic components into the resulting hypergraph environment. The potential complexity of this process is recognized, requiring general computational science programming knowledge and expertise to accomplish. To significantly ease this development burden and further accelerate deployment, a special hypergraph Analytic Builder application may be included with the preferred solution.

The hypergraph analytic builder includes an intuitive user interface for specifying and connecting heterogeneous data sources, binding them to transformation/adapters and other existing analytics, and then automatically generating an operational analytic. The builder enables users to specify data transforms (theories), hypergraph patterns (models), and view generators (interpretations) using the hypergraph algebra. These items can then be selected in drag-and-drop style to automatically create a hypergraph adapter, analytic, or view. This application is akin to the "Ruby on Rails" style of application development, but specifically designed for hypergraph analytic design and implementation.

The solution described herein has broad applicability across myriad scenarios and is critically dependent on the sharing of knowledge across myriad of organizations and data sources. The recent disclosures of the government's global surveillance activities have reignited the complex debate regarding access to personal information. This debate places our desire for national security in tension with our Constitutional protection of individual liberties. Public opinion has framed this as a tradeoff, balancing sacrifices of civil liberties for gains in national security. In a specific implementation of the solution, sharing and analysis of private information is accomplished through the realization of a "Black Box", an information container whose contents by design can never be inspected. This container is a special computational device that allows information to be input, but provides no means for any individual to ever examine its contents. Rather, the box can only report the detection of specific patterns that have previously been authorized as lawful, without ever revealing any of the private information itself. The basis for this approach is the standard of law derived from the U.S. Constitution that enables law enforcement to investigate items that present reasonable suspicion without resorting to unreasonable search or seizure.

Important, private information is often NOT shared today due to overriding privacy concerns. The recent case of the missing Malaysia Airlines Flight #370 involving travelers with stolen passports is a real, sobering example. Information today is frequently not shared among various government organizations despite their authorized charters for national security, securing the general welfare, and the benefiting the greater public good. Privacy concerns, particularly in the wake of the Snowden disclosures, has arguably created an information sharing paralysis that is widespread across the government. Current techniques for limited sharing often employ anonymization techniques shown to be ineffective at increasing global scale. Other techniques resort to obfuscation of data that often results in lack of analytic fidelity and poor analytic yield. Alternative approaches have resorted to liberal interpretations of the law in attempts to balance civil liberties with national security needs, arguing that in this modern age the expectation of privacy has been significantly diminished. And numerous hybrids have been offered involving limited access controls, compartmentalization, "blindfolded" search, and "trusted" $3^{rd}$ party agreements, each with a resulting blend of the above limitations. The Black Box approach to privacy proposed here is successfully being deployed for sharing of very sensitive private information pertaining to HIV/AIDS (described in [21]), but in a custom, special-purpose device fashion. This proposed effort generalizes that approach, offering a generic solution for a broad spectrum of private information analysis and sharing applications.

Within the framework's Layer C (FIG. 1), information must be analyzed in accordance with policy and law. Thus, it is within Layer C that automated implementation of privacy is maintained. This is shown notionally in FIG. 11. In its most robust protected form, Layer C is viewed as a strict "black box" that makes absolutely no allowance for any access to the information contained inside. This security concept allows information to be aggregated but prevents it from ever being released outside of its confines. Rather, policy/law compliant patterns approved by an appropriate policy body are provided to the black box through a very strictly controlled interface. The black box operates by outputting only the identifiers of patterns that are detected, and any associated information that the policy body unanimously pre-approved for reporting. Participating organizations use these automated pattern detection reports to initiate legally appropriate actions to further investigate within their currently existing policy/legal authorities. As privacy concerns and authorities vary widely from organization to organization, the framework recognizes that a spectrum of black box containers, each with a varying degree of data/privacy protections is needed. Thus the framework enables black boxes of varying shades (i.e. grey boxes) each with differing levels of privacy restrictions, such as "Public/Open", "Sensitive", "Restricted", "Classified", "Compartmented", "Strictly Private", etc.

Figure 11:
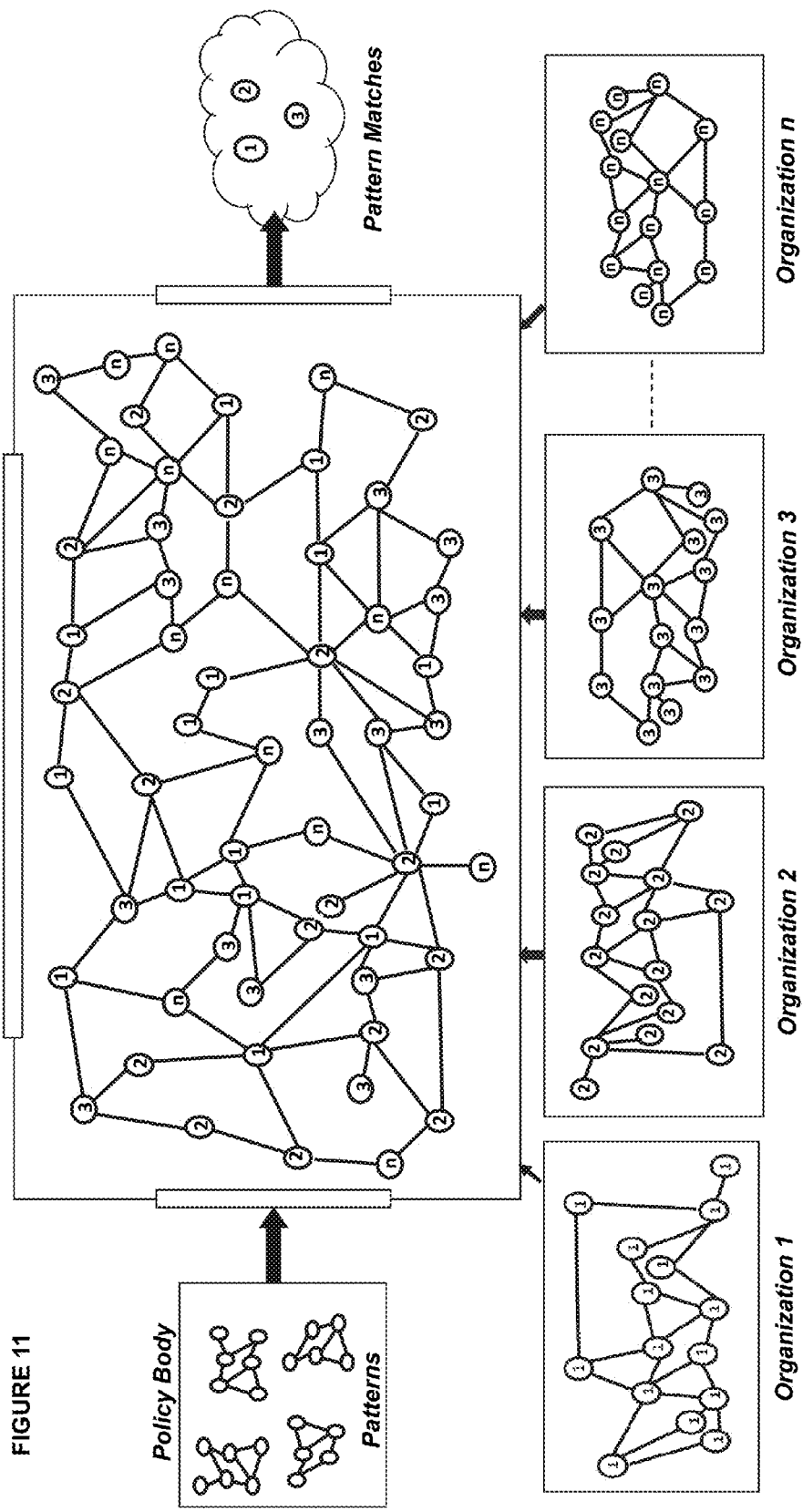
FIG. 11 is a schematic illustrating a privacy assurance process usable within the framework described herein.

More specifically, the black box of FIG. 11 is a computational device (i.e. a computer with self-contained memory and storage) specifically designed to be "non-queryable" by any means. That is, the device offers no mechanism of any kind for any individual, regardless of authority level or security access, to examine its contents. The box does, however, have exactly one additional input and exactly one output. At the left interface, "patterns" of specific interest are input to the box. These patterns are template-like encodings of information relationships that a duly authorized policy/oversight body has reviewed and approved for submission into the box. Put another way, the patterns are a set of analytical rules that define the Black Box's reasonable search behavior. The only patterns that are admissible to the Black Box are those that the policy/oversight body has reviewed and has unanimously confirmed as meeting the necessary threshold (e.g. the legal standards for reasonable suspicion and ethical standards of non-discrimination).

An algorithm that continuously observes for conditions that match any of the submitted patterns lies within the Black Box, in addition to the information that it receives from each contributing organization, and the patterns it receives from the policy/oversight body. Upon detecting such a pattern, the Black Box outputs an identifier for the pattern and any authorized auxiliary parameters. The specification for such auxiliary information is incorporated within the original pattern definition, enabling the policy/oversight body to review and approve, and ensure privacy compliance. The internal Black Box operation is a continuous process. It is executed in real-time and without human intervention.

Upon a pattern detection event, the information output by the box would flow only to those organizations authorized for that pattern, as specified in the original pattern input. All information output by the Black Box would be available to the policy/oversight body or a duly constituted alternative body to continuously verify compliance. An exemplary general description of an applicable black box concept is found in United States Publication Number 2012/0131189 entitled Apparatus and Method for Information Sharing and Privacy Assurance the contents of which is incorporated herein by reference in its entirety.

The framework Black Box construct recognizes that the level of privacy obtainable is directly related to the level of system "impenetrability" that can be achieved, involving a risk-cost-benefit tradeoff Depending upon the nature of the information to be protected, not all information sharing and analysis application will require the same degree of rigor to ensure adequate protections. Consequently, a multi-level privacy certification rating is envisioned. Analogous with cryptographic systems, the following four levels of privacy certification are proposed:

Type 1 Privacy: a device or system that is certified for government use to securely share and analyze private information consistent with the highest level of protections awarded by the U. S. Constitution. Achievement of this rating implies that all components of the end-to-end system have been subjected to strict verification procedures and protected against tampering via strict supply chain controls.

Type 2 Privacy: a device or system that is certified for commercial use to securely share and analyze public information consistent with U.S. commercial law. Achievement of this rating implies that all interface components of the system have been subjected to strict verification and supply chain controls and that all other components have been subjected to reasonable best industry practices for operation verification and supply chain control.

Type 3 Privacy: a device or system that is certified for public use to securely share and analyze sensitive information. Achievement of this rating implies that all components of the system have been subjected to reasonable best industry practices for operation verification and supply chain control.

Type 4 Privacy: a device or system that is registered for information sharing and analysis, but not certified for privacy protection. No assumptions regarding component verification or supply chain controls are made about systems at this privacy protection level.

For the highest grades of privacy protection, it is important that Black Box components be procured and protected via supply channels that prevent malicious (or accidental) tampering. While not typically prevalent throughout the commercial sector, the notion of trusted supply chain is commonplace in the defense/weapons industry where the consequences of compromise could be enormous. While the detailed specifics of these controls might often be compartmented for security purposes, established techniques include the use of trusted chip foundries, anti-tamper packaging, security seals, and two-person rule handling procedures.

Using this approach, infiltrating malicious code into the Black Box, or exfiltrating private information from the Black Box will be extremely difficult. To accomplish either would require an extremely sophisticated insider with the ability to bypass the internal Black Box controls in order to introduce a covert channel. While not impossible, this would substantially raise the risk and cost an adversary must expend, particularly to subvert the verification process and any accompanying set of supply chain controls. For the highest levels of privacy protection, these verification and supply controls would need to be applied end-to-end to the system including power and cooling supplies for the most robust "Type 1" privacy applications. Thorough vulnerability analysis processes of this type are now common for very high-graph physical security systems involving the protection of extremely valuable assets (e.g. nuclear material and associated weapons components) and could be readily leveraged in future efforts.

Figure 12:
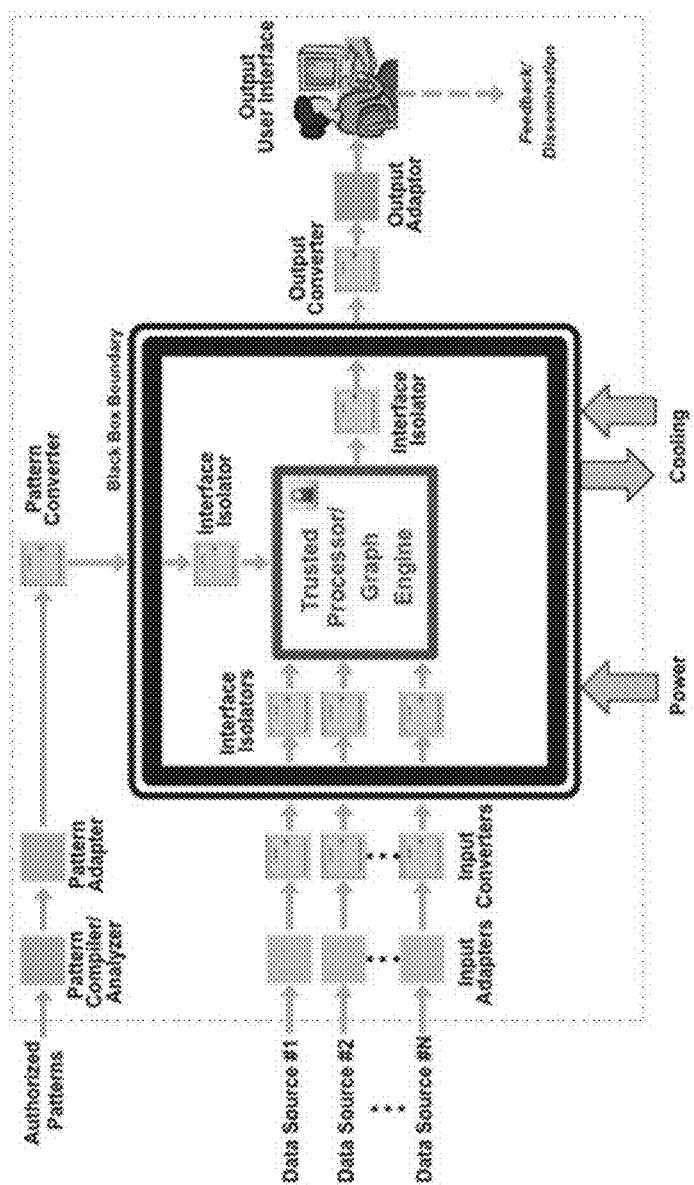
FIG. 12 is a schematic illustrating a Black Box usable within the framework described herein.

Referring to FIG. 12, the five key components of the Black Box design include: Black Box Boundary; Black Box Adapters; Black Box Converters; Black Box Isolators and Black Box Engine The Black Box Boundary At the center of FIG. 12 is a depiction of the Black Box container with a rigid "impenetrable" boundary. The design and implementation of this boundary is of critical importance. The container itself may range in size from an actual physical box to an entire data center. Should the contents of the container of whatever size be viewable, either through direct or indirect means, the premise of its operation would be compromised. Perfect impenetrability, however, is difficult or impossible to prove, and the costs may be prohibitively high depending upon the level of protection necessary for the information being protected. "Impenetrability" here is defined as the condition in which a team of qualified, expert witnesses under sworn testimony provide a preponderance of evidence that the box exhibits no known exploitable vulnerabilities that would provide access under a reasonable set of assumptions. It is envisioned that these assumptions will vary depending upon specific application, the sensitivities of the data, and the damage of compromise. Thus this effort proposes an accompanying set of privacy certifications levels (above) to be better match cost with specific privacy needs depending upon the information sharing application. For efforts requiring the most robust civil liberties protections, the Black Box boundary is assumed to be no less than a physical and electronic hardware barrier that has been subject to formal vulnerability analysis and proof-of-correctness (i.e. "Type I" or "Type II" privacy).

The creation of "impenetrable" physical and electrical barriers is not new. The defense industry has a very extensive, and often highly compartmented, anti-tamper tradecraft for assuring such impenetrability particularly for weapons systems (both nuclear and conventional) where the consequence of compromise could be quite severe. What is new is the application of these techniques to information sharing where the protection of private information is given analogous security treatment.

The Black Box Adapters

Perhaps the most significant challenge in constructing a Black Box is in interfacing it to an external environment. This is obviously a necessity if the box is to be of any value. However, a system's interfaces are generally where its vulnerabilities are most often found and exploited. As mentioned, software systems of appreciable size (e.g. >100,000 lines of code) are notoriously difficult to prove correctness. In order to render this verification process tractable, a very simple yet very powerful specification is used for all of the Black Box's interface channels. To ensure adequate analytic expressive power within the Black Box, a graph theoretic information representation is taken. That is, the information content of the Black Box is organized as a large (hyper) graph consisting of attributed vertices and attributed (hyper) edges. As this is now a commonplace representation framework in modern analytic tradecraft, the graph construct is chosen as it provides sufficiently rich expressive power for most if not all envisioned analytic/information sharing processing applications. These techniques have been shown to yield high analytic performance at very large scale (e.g. >billion vertices; >trillion edges). In addition, the graph construct is known to be computationally complete, enabling any pattern-matching algorithm of arbitrary complexity to be encoded in this framework.

External to the Black Box in FIG. 12 are three types of adapters: input, output, and pattern. The roll of an input adapter is to convert information from an input source into a subgraph structure, such as the "dot" networks depicted at the bottom of FIG. 11. It is these subgraph structures that are input into the Black Box, rather than raw data from the input source itself. This is particularly important for both scaling and information security (discussed below). The graph representation choice has two additional benefits. First, patterns can also be specified as attributed subgraphs, where the attributes affixed to specific graph vertex/edge structures specify pattern-matching conditions. In essence, graph patterns (queries) can themselves be readily encoded as subgraph structures. Secondly, the result of a graph pattern match is itself also a subgraph that can subsequently be output from the box. External to the box, this subgraph can be converted via the output adapter into an appropriate format for dissemination. Using graph structures in this manner as a common canonical form, the design and engineering of the box and its interfaces is greatly simplified, leveraging a large wealth of existing graph analytic tradecraft. This also greatly aids the formal verification process, simplifying the system interface specification considerably.

The application of the graph paradigm to analytic processing is now commonplace. The ability, however, to adapt numerous disparate, distributed data sources into a single common graph framework is only just recently become possible via Raytheon's information overlay technology. This technology performs all adapter communication using a simple yet powerful graph-based data exchange protocol. This protocol enables the adapters to specify the creation and deletion of graph elements (vertices and edges) and to affix attributes to each. The input and output adapters communicate with their respective Black Box converters using precisely this protocol. The same is true for the communication between the Black box output converter and its respective adapter. The utility of this exchange protocol is discussed next.

The Black Box Converters

Despite substantial progress in software and hardware development practices, contemporary systems often contain flaws in their specification, design, and/or implementation. An adversary attempts to exploit these flaws in order to gain unauthorized access to a system or to put the system into an undefined or unintended state. Examples include buffer overflows, stack overflows, and exceeding array bounds and variable constraints. In these circumstances, an adversary may find a way to penetrate a system by disguising malicious code within data that may later be inadvertently executed to gain unauthorized access. The methods used by adversaries in recent years have become increasingly clever and insidious. These are serious concerns that must be very carefully addressed in order to best assure the integrity of the Black Box. The Black Box converters are incorporated to address these issues.

The roll of the Black Box converters are to transform the graph data exchange protocol communicated by the Black Box Adapters into a physical electrical or optical protocol to traverse the Black Box boundary. This lowest level protocol is rigidly defined and enforced using combinatorial logic that can be unambiguously specified and verified in advance. As envisioned, the Black Box converters are implemented using Application-Specific Integrated Circuit (ASIC) or Field Programmable Gate Array (FPGA) hardware devices to best aid high-assurance operation. The ability to convert and serialize a graph data exchange protocol into an electrical or optical bit stream has been recently demonstrated at Raytheon using a FPGA implementation. This bit stream can be generated at the Black Box boundary and transmitted directly across or encapsulated within an encrypted point-to-point long-distance data channel.

The Black Box Isolators

Properly contained within the Black Box boundary are the Black Box isolators. The isolators are the internal counterparts to the converters, implemented again via ASIC/FPGA. While the input and pattern converters transform the graph exchange protocol into an electrical/optical digital signal to traverse the Black Box boundary, the input and pattern isolators perform the reverse function transforming this digital signal back into graph primitives for exchange with the internal logic engine. For Black Box output channel, the process is essentially reversed with logic engine output flowing first through the output isolator that generates the signal encoding of the graph exchange protocol before traversing the boundary in route to the output converter/adapter. As envisioned, the graph exchange prototype is symmetric, thus the same design can be used for both the converters and the isolators, greatly simplifying the implementation burden. The graph exchange protocol communicated by the converters and isolators involves a strict set of fixed primitives. These primitives are fully specified meaning that all protocol fields, parameters, and states must be completely defined in advance.

The converter-isolator pair construct is critical to the Black Box approach. These devices enable the Black Box to communicate with the external world, but only through very strict, rigidly defined messages. Using the graph exchange protocol, all the fields in these messages are fully specified. The only parameters specified by the prototype are constrained integer values, fully enumerated type fields, or fixed length attribute strings. With the input, output, and pattern adapters, their respective converters, and the indeed the input sources themselves all sitting outside of the Black Box boundary, it is possible that any of these components could potentially be compromised. With the input, output, and pattern isolators all residing within the boundary, however, the correctness of their operation can be verified and then sustained. This is accomplished via the application of formal methods technique and strict supply chain controls of the devices.

Researchers at Southern Methodist University (SMU) in cooperation with the University of Texas-Austin have demonstrated the ability to formally verify the security properties of isolator-like circuitry. This was previously performed using the initial prototype FPGA isolator developed at Raytheon. The process begins by generating a formal specification of the circuitry given the Hardware Description Language (e.g. Verilog or VHDL), followed by the formulation of a threat model. Threats can occur as a result of exploitation of design errors or the exploitation of unspecified design functionality. Given the threat model and the device specification, the security properties may then be formally proven to hold using either automated theorem proves or model checkers, with the latter being recommended by SMU for this effort. The model checking approach enables the isolator FPGA circuit model expressed in the HDL to be used directly without the need for intermediate theorem proved synthesis steps.

For the highest grades of privacy protection, it is important that Black Box components be procured and protected via supply channels that prevent malicious (or accidental) tampering. While not typically prevalent throughout the commercial sector, the notion of trusted supply chain is commonplace in the defense/weapons industry where the consequences of compromise could be enormous. While the detailed specifics of these controls might often be compartmented for security purposes, established techniques include the use of trusted chip foundries, anti-tamper packaging, security seals, and two-person rule handling procedures.

Using this approach, infiltrating malicious code into the Black Box, or exfiltrating private information from the Black Box will be extremely difficult. To accomplish either would require an extremely sophisticated insider with the ability to bypass the internal Black Box controls in order to introduce a covert channel. While not impossible, this would substantially raise the risk and cost an adversary must expend, particularly to subvert the verification process and any accompanying set of supply chain controls. For the highest levels of privacy protection, these verification and supply controls would need to be applied end-to-end to the system including power and cooling supplies for the most robust "Type 1" privacy applications. Thorough vulnerability analysis processes of this type are now common for very high-graph physical security systems involving the protection of extremely valuable assets (e.g. nuclear material and associated weapons components) and could be readily leveraged in future efforts.

The Black Box Engine

At the core of the Black Box is the logic engine. The logic engine is a computational device programmed to maintain a representation of the source inputs in volatile memory and continuously execute a pattern-matching algorithm that examines this representation and reasons about its contents.

In essence, the logic engine is an inference machine that uses the input sources to construct a graph-structured fact base and the pattern statements to define search rules over that base.

In anticipation of the formal verification process, this effort proposes the use of the eXtensible Knowledge Server (XKS) from HIGHFLEET, Inc. as the prototype logic engine. As a commercial product, XKS is unique in that it allows problems to be expressed using a first-order logic compatible semantics. This will be a particularly important aid during the verification phase.

The XKS system implements a deductive database server. It uses a technology that is based on Resolution Theorem proving, with ideas from XSB and its SLG (tabling) resolution, and parallel inference that handles recursion through tabling of intermediate results. The model (or ontology) for an XKS database is defined by a General Logic Program written in KFL (Knowledge Frame Language) which is largely a syntactic variant of ECLIF (Extended Common Logic Interchange Format). The deployment of an XKS from a given KFL source is similar to compiling a logic program. The XKS stores facts persistently providing standard ACID properties of a database system (Atomicity, Consistency, Isolation, Durability).

The KFL language supports general logic programming statements where each relation defined in the KFL source may have any number of rules associated with it where each such rule has the form of a (<=HEAD GENERAL_BODY). In such a rule the HEAD is a simple literal for that relation with arguments that are any well-formed terms in KFL and the GENERAL_BODY is any well-formed formula in first-order logic expressed in the syntax of ECLIF. ECLIF provides syntactic expression for basic terms (strings, numbers, symbols, variables) and compound 'function' terms (a special term with a symbol term as its function and any number of arguments that are terms). Certain function terms are given special interpretation by the XKS—these include dates, time spans, and measurements (e.g. '(kilometer 37)').

There are several extensions beyond classical First-Order Logic supported by KFL/ECLIF and the XKS: integrity constraints, temporal logic, aggregation operations (e.g. 39etoff, count, average, min), extensional equality, and measurement terms. The syntax of First-Order Logic supported in ECLIF include terms as discussed above, atomic literals that name a relation and provide terms as arguments, and standard operators that combine literals such as 'and', 'or', '=>' (implication), 'forall', 'exists', and 'not'. For example, a relation that relates a person to things that person makes, 'makes', might have facts such as (makes anne brick) to say the Anne makes bricks. (makes anne brick) is an atomic literal. (not (makes anne pie)) asserts that it is not true that Anne makes pies. To say that everything Anne makes is a BuildingMaterial we can use the well-formed formula (forall (?x) (=>(makes Anne ?x) (BuildingMaterial ?x)).

KFL includes special relations: 'inst' for 'instance of', 'sup' Rel for "is a super relation of", and the unary relation Property for "is a Property". There is a complex "upper level ontology" ('ULO', written in KFL) that is used when creating a model in KFL. The ULO source is added to the new model KFL source to make one (large) program. The XKS presumes the presence of certain aspects of the ULO for any KFL source that it deploys. The XKS system has special implementations for 'inst', 'supRel', Property, and many other standard parts of the ULO.

The KFL deployment/compilation process mostly processes the KFL source as though it was a collection of queries, applying the same compilation process to the KFL source statements as the XKS applies to queries of a deployed database. This compilation process produces a collection of 'clauses' where a clause has a HEAD (similar to the GLP HEAD above) and a NORMAL_BODY. The NORMAL_BODY is a simple conjunction of literals, either atomic literals or negated atomic literals. This collection of clauses is the 'store' that represents the model for the XKS. It is unchanging for the duration of a running XKS (it can be updated, but this requires stopping the XKS).

A query of an XKS is compiled 'against' the store for that XKS creating an optimized specialized version of the store that is developed just for evaluating that query. This is a kind of partial evaluation where the results of 'partially evaluating' an ECLIF formula is a collection of clauses. There is a unique top-level literal that when evaluated produces exactly the answers for the original query.

In the Black Box setting, information received from the source data systems via the input adapter-converter-isolator channels will be treated as logic assertions that XKS uses to build and populate the graph/logic model. Similarly, patterns received via the pattern adapter-converter-isolator channel are forwarded to XKS as queries. XKS will be configured to handle these in a continuous, non-stop persisted query fashion. When XKS detects a new pattern, the response will be transmitted via the output isolator-converter-adapter channel.

For this effort, the correctness of the logic engine operation will be assumed. To address the inevitable possibility of both design and implementation flaws, the pattern-matching algorithm is to be subjected to formal verification. The selection of XKS with its first-order logic semantics is expected to aid this process. Verification of the entirety of the underlying logic engine is important for applications requiring the most robust privacy protections (i.e. "Type I"). In such settings, the logic engine in turn will need to be hosted on trusted, formally verified tamper-protected, supply chain-controlled processors. While this level of verification is impractical for today's commodity processors equipped with both very rich modern and legacy instructions sets, it is considered tractable for future generations, given the discrete combinatorial logic structure of these units. By restricting the logic engine specifications to first-order logic, the architecture and design requirements for a new generation of high-assurance trusted logic engine devices/processors can be readily envisioned for future privacy assurance endeavors.

"Black Box" Operation

Using all the components identified, the operation of the proposed Black Box works as follows. For each input source, an input adapter is assigned that interfaces to that source. The adapter extracts the primary information entities and relationships that the source organization desires to be shared privately via the Black Box. The adapters converts these items into an attributed subgraph, then using the graph exchange protocol communicates the elements of this subgraph one at a time via an encrypted channel to its respective input converter. The input adapter would typically be located in close proximity to the source system, and managed under its security controls. In contrast, its corresponding input converter would be located at the Black Box boundary to prevent input tampering and disclosure. Input adapters continuously monitor their sources for changes in their information subgraphs, forwarding these changes to their respective converters to update the Black Box.

The input converters at the Black Box receive encrypted graph exchange messages from their respective adapters.

The messages are "down converted" into digital electrical/optical signals via the FPGA/ASIC converters and then transmitted across the Black Box boundary to the receiving isolators within. These isolators then re-convert the signals back into their corresponding graph operations and feed these into the logic engine. Depending up the operation, the logic engine updates the aggregate graph knowledge base (logic model) by adding or deleting the appropriate vertices, edges, and/or affixed attributes. This process is repeated indefinitely with information updates flowing from each input source continuously into the Black Box as they occur. Should power ever be interrupted to the Black Box, or the logic engine is restarted, the process is purposefully repeated over from the start across all sources.

Operating in parallel with the Black Box input process is the pattern process. As patterns are reviewed and approved by the policy/oversight body, the patterns are encoded in a formal high-level language. These language statements are then passed through a compiler that creates a set of first-order logic statements. For this initial effort, English is envisioned as the high-level language with the compilation being done by hand. In subsequent efforts, however, a more appropriate restricted, structured language for encoding patterns will be selected for automated compilation. The first-order logic results of this compilation (whether generated manually or automatically) will be forwarded to the pattern adapter. The pattern adapter transforms the first-order logic statements into a subgraph using first-order logic attributed semantics. This subgraph is then sent to the pattern converter to be down converted into a set of Black Box digital signals to traverse the boundary in via the pattern channel. Within the Black Box, each of these signals are up-converted back to a corresponding set of graph exchange messages forwarded to the logic engine. The engine uses these messages to create the corresponding pattern subgraph within its aggregate knowledge (graph) base. The logic engine algorithm then adds this pattern to its continuous matching process.

When the logic engine detects a pattern match, the engine generates a results subgraph based upon the output specification affixed as attributes to the pattern subgraph. This results in a subgraph that is then be passed via the output isolator to the output converter and finally the output adapter for dissemination at the output user interface. For the proposed activity, a simple printout is proposed initially. For subsequent implementations, however, a much richer automated distribution process is envisioned that automatically forward results directly to the appropriate organization to pursue (e.g. one or more of the authorized input). The result might also be automatically forwarded to the policy/oversight body for oversight and compliance audit.

Figure 13:
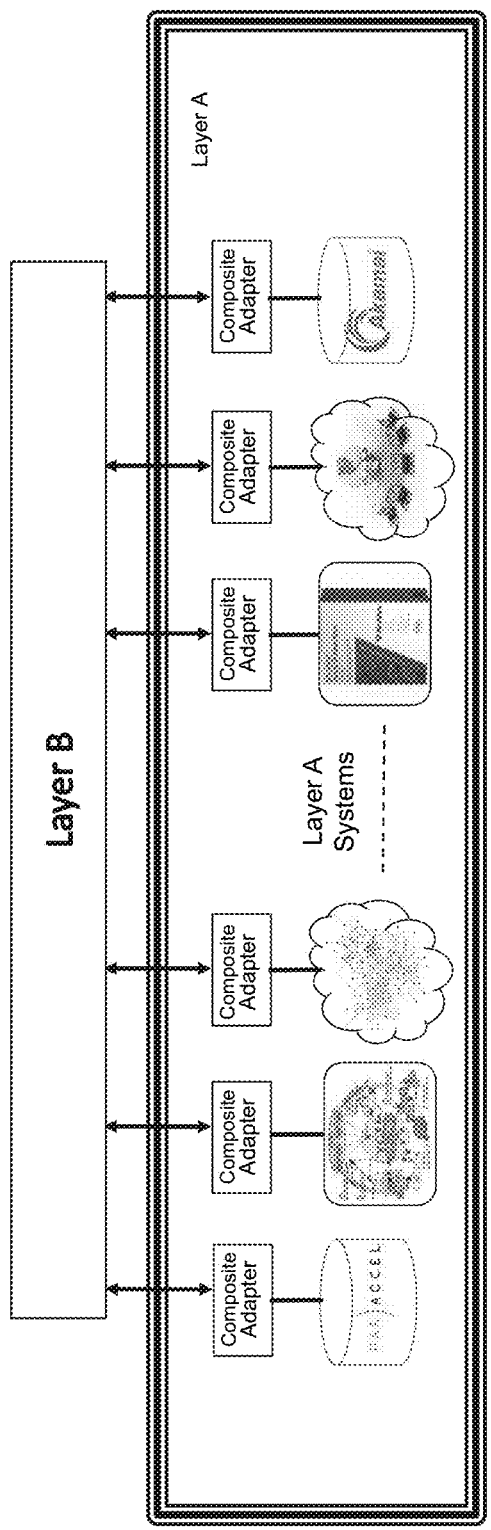
FIG. 13 is a schematic showing components of Layer A of the framework described herein.

In the context of the solution framework described above (FIG. 1), the primary requirement imposed on Layer A source systems is that each provide some sort of interfacing mechanism or API to enable access to the allowable functions they choose to offer and support within a framework environment. It is via this local API that a Layer A source system is connected into the larger framework enterprise. As shown schematically in FIG. 13, this connection is accomplished via a composite adapter. A composite adapter is a software (typically, but not necessarily) subsystem that interfaces a Layer A source system via its API to the Layer B above.

The composite adapter is important for several reasons. It is assumed that Layer A source systems are enormously diverse in their capabilities, functions, and implementations. The design of this adapter structure is formulated to dramatically decrease the cost and time associated with integrating such diverse systems at such large scale. The role of the composite adapter is to isolate all unique, custom interfacing work for interacting with Layer A source system data into exactly one location in Layer A so that the other components across the framework may be standardized and generic. This is an extremely powerful and discriminating offering. This structure promotes an open "culture" for large-scale, highly secure distributed systems integration. That is, all data systems desiring framework integration can contribute regardless of their capabilities, but without fear of compromise. Systems with a very rich API would be able to leverage all features and benefits of the framework while systems with limited APIs would only participate up to their limits of capability. The composite adapter handles this often complex, troublesome interfacing burden, transforming the Layer A source system's custom API into a framework compliant component. This transformation is aided via a standardized, non-proprietary protocol to the Layer B above.

Layer B's primary purpose is to provide a common, robust, scalable access mechanism to Layer A information, but without sacrificing local autonomy, jeopardizing system security and integrity, or violating privacy. Essentially, Layer B performs an integration service across the entire spectrum of Layer A products, services and systems, providing a fabric that weaves together each into a single cohesive, unified framework. Layer B accomplishes this "plumbing" challenge through a series of powerful information transformations specifically formulated for large-scale distributed systems operation. These transformations effectively map Layer A source system data exhibiting exponential growth into Layer C information entities and relationships with limited asymptotic behavior.

As a result of these transformations, Layer B enables the creation of an extremely strong security isolation barrier to prevent unauthorized data breaches, vulnerability-inducing data or cyber contamination (e.g. malware transmission), or usurpation of control (e.g. hacking) This barrier establishes a trust boundary above which Layer C analytic processing can be performed, but without compromise to any constituent Layer A source components. Similarly, the barrier prevents individual Layer A source components from compromising the integrity of Layer C operations or another Layer A source component in an aggregate framework enterprise. To achieve this high degree of integrity, the framework Layer B boundary is designed specifically so that the interface implementation can be rigorously defined and mathematically proven. The robustness of this trust/isolation boundary is particularly important for applications requiring the highest levels of privacy protection and preservation (i.e. "Black Box" applications).

Figure 14:
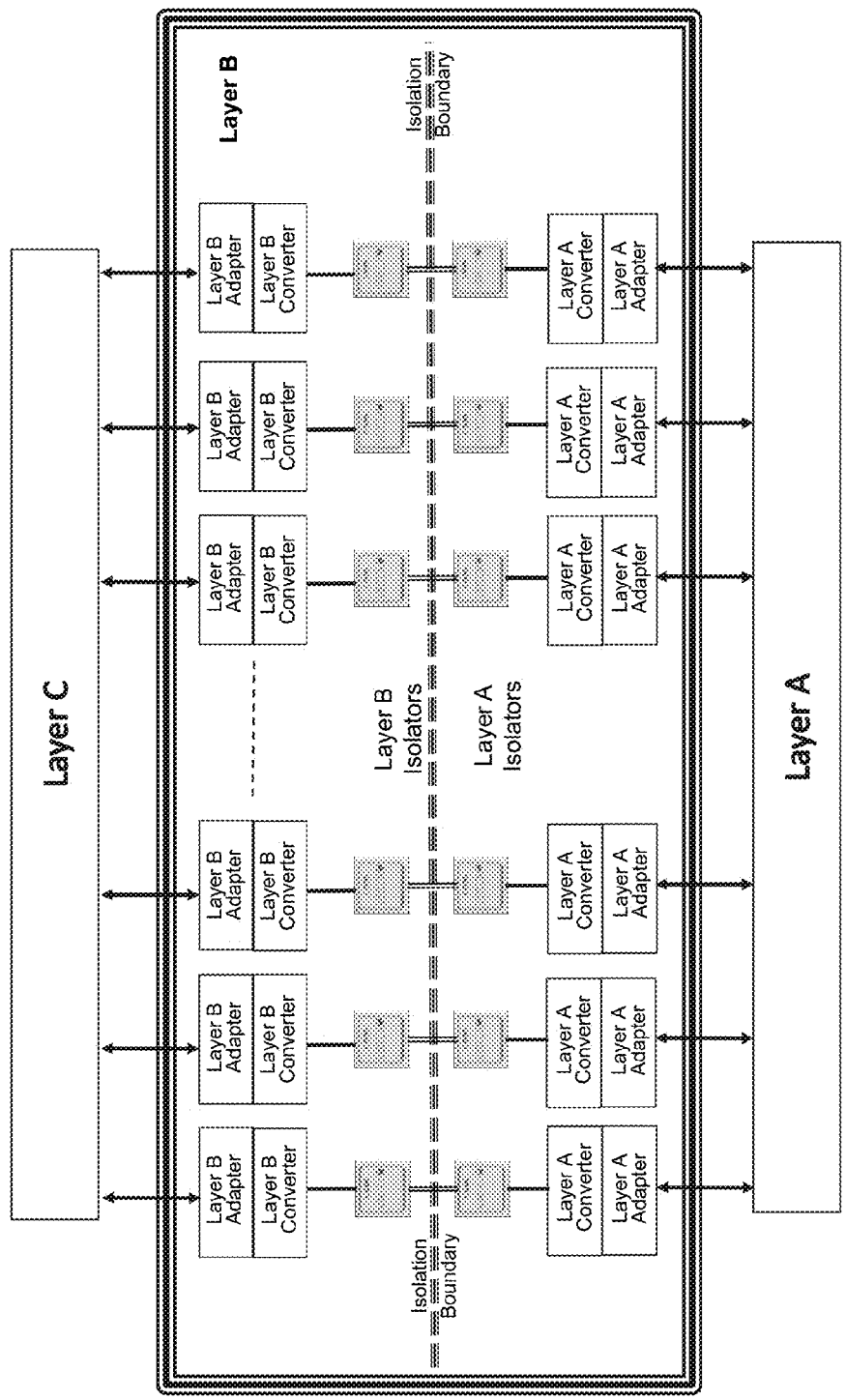
FIG. 14 is a schematic showing components of Layer B of the framework described herein.

The key components of Layer B are shown in FIG. 14. Information distributed across Layer A source systems is pushed and pulled on demand to and from the Black Layer above through a series of Layer A-Layer B adapter/converter channels. The Layer A adapters (in FIG. 14) connect Layer A source systems to these channels via each system's respective Layer A composite adapters (from FIG. 13). Layer A adapters speak to upper Layer B components through a Layer B API that defines a special protocol. That is, all communication to the upper layer components references framework entities, their relationships, attributes, and events. The Layer A adapters are responsible for transforming Layer A source system data, as presented by the Layer A composite adapters, into these graph elements in conformance with the Layer B API. Stated differently, the Layer A adapters are the framework components that perform the transformation from the exponential-grown data streams into the asymptotically limited information entity/relationship sets. By doing so, the Layer C analytics above will need not be concerned with the specific implementation and data details of these elements.

Upon the Layer A adapter's transformation of Layer A source system data into graph elements, communication of these elements can now be serialized for security and privacy isolation purposes. The role of the Layer A-Layer B converters is to do just that. That is, the Layer A converter takes incoming graph elements from the Layer A adapter and converts these elements into a set of serialized graph transactions (e.g. create node, create link, add attribute, remove attribute, etc.). These transactions are formatted using a simple protocol consisting of well-defined operation codes and message parameters that fully encode the graph transaction. This encoded sequence is then delivered to the Layer A isolator for transmission across the Layer A-Layer B isolation boundary to the corresponding Layer B isolator. To ensure that only the properly structured transactions successfully cross the Layer A-Layer B boundary, isolators are typically implemented as hardware devices such as Field Programmable Gate Arrays (FPGAs) or Application Specific Integrated Circuits (ASICs). Using formal methods based on model checking techniques for information processing circuitry, the operation of these devices can be verified mathematically to establish the correctness of their implementation. As these devices are built from combinatorial logic circuitry, verifying their correctness is a manageable process conducive to automation, whereas verifying an alternative conventional software implementation (e.g. code development in Java or C++) could quickly become unwieldy. The choice of hardware isolation makes this verification process tractable using contemporary proof techniques.

On the Layer B side of the boundary, the Layer B isolator and Layer B converter perform the reverse operation of their Layer A counterparts. The Layer B isolator device receives encoded graph transactions from the Layer A isolator, and then forwards these transactions to its corresponding Layer B converter. The Layer B converter converts the serialized graph transactions back into the equivalent entity/relationship representation. The Layer B adapter then contributes these elements to Layer C knowledge graph in conformance with the Layer C API.

Accordingly, the role of the Layer B converters is to transform the graph data exchange protocol communicated into a physical electrical or optical bit stream to traverse the Layer C boundary. This bit stream can be generated at the Layer C boundary and transmitted directly across or encapsulated within an encrypted point-to-point long-distance data channel.

As mentioned, all Layer B adapters interact with Layer C via the exact same API. That is, the specification that defines the complete set of operations and accompanying parameters that a Layer B adapter can perform upon the Layer C knowledge graph are identical for all Layer B adapters, regardless of their location in a global framework enterprise. However, the specific implementation of this API on the local platform where this adapter is running can vary considerably. This discriminating framework feature is very important as it allows implementations to exploit the unique performance features of the local platform, yet maintain platform independence of developed software.

To further greatly reduce the framework implementation burden, the Layer C API specification that is visible to all Layer B adapters is actually also identical to the Layer B API specification visible to all Layer A adapters. The implementation of these APIs, however, is again quite different. The Layer A Converter, the Layer A-Layer B isolator pair, and the Layer B adapter essentially recreate the Layer B API at Layer C but with the critical interim hardware-assisted filtering steps necessary for security and privacy enforcement. Whereas a Layer C API implementation exists within (above) the Layer A-Layer B trust boundary, a Layer B API implementation is actually responsible for creating and enforcing that boundary. The Layer B enforcement mechanism employs the convert-isolator pairs for high-assurance operation founded on mathematical proof-of-correctness. It is envisioned that Layer B API implementations will be additionally augmented with anti-tamper capabilities to further deter cyber adversaries and attempts at privacy violation. The resulting Layer B component design makes the transmission and/or exploitation of malware, viruses, backdoors, Trojan horses, etc. extremely difficult, significantly raising the risk, level of sophistication, and amount of investment needed by an adversary.

Specific and non-limiting black box use cases are described herein to illustrate functionality and application. Initially, suppose a group of people wish to conduct a legitimate test of the "Birthday Paradox", but do not wish to reveal any of their personal information. The Birthday Paradox concerns the probability that, in a set of n randomly chosen people, some pair of them will have the same birthday. By necessity, the probability reaches 100% when the number of people in the group reaches 367 (since there are only 366 possible birthdays, including February 29). However, with just 23 people, the probability is 50%, and with 70 people, the probability is 99.9%. To test the Birthday Paradox without revealing personal information, a Black Box is used. To illustrate how this is done, let the set $P=\{p_1, p_2, \ldots p_n\}$ represent the group of n people. Each participant in P considers their name and birthday to be private. The process begins with each person (privately) expressing this information via an input adapter in a formal manner. This is accomplished with statements of the following form:

$$P(p_1) \wedge \text{name\_of}(p_1) = \text{"Alice"} \wedge \text{birthdate\_of}(p_1) = \text{"01/23"}$$

$$P(p_2) \wedge \text{name\_of}(p_2) = \text{"Bob"} \wedge \text{birthdate\_of}(p_2) = \text{"02/04"}$$

$$P(p_3) \wedge \text{name\_of}(p_1) = \text{"Carol"} \wedge \text{birthdate\_of}(p_3) = \text{"12/25"}$$

where the predicate $P(p_i)$ is interpreted as "$p_i \in P$ is a person", and the functions name_of and birthdate_of return the name and birthdate, respectively, of that person. That is, the person named "Alice" was born on January 23, the person named "Bob" was born on February 4, etc. The role of the Black Box in this example is to determine the truth value of the logic statement $\underline{L}$ (i.e. a Black Box pattern):

$$L = \exists p, q | P(p) \wedge P(q) \wedge \text{birthdate\_of}(p) = \text{birthdate\_of}(q) \wedge p \neq q$$

To accomplish this in a general-purpose fashion, a graph-based representation of the problem is used by the Black Box. That is, the box internally constructs a graph $G=(V, E)$ where the vertex set $V=\{v_1, v_2, \ldots v_n\}$ with $n=|V|$ and the edge set $E=\{e_1, e_2, \ldots e_m\}$ with $m=|E|$ and $e_j \in V \times V$. Thus each element $e_j \in E$ is an ordered pair of the form $(v_k, v_l)$ with $v_k, v_l \in V$. The graph is attributed so that every vertex $v_i \in V$ may be assigned a vertex type attribute $v_i'\text{TYPE} \in T_V = \{\mu_1, \mu_2, \ldots\}$ and every edge $e_j \in E$ may be assigned an edge type attribute $e_j'\text{TYPE} \in T_E = \{\epsilon_1, \epsilon_2, \ldots\}$ where $T_V$ and $T_E$ are finite sets. For this example, $T_V = \{\text{person, name, birthday}\}$ and $T_E=\{\text{name\_of, birthdate\_of}\}$. In addition, every vertex $v_i \in V$ may also be assigned a vertex value which is dependent upon its vertex type. For this example, the following vertex values may be assigned:

| Vertex type | Vertex Value |
|---|---|
| person | integer |
| name | fixed length alpha string (e.g. max. of 50 characters) |
| birthday | four numeric characters (e.g. MM/DD format) |

This graph structure enables the box to represent any number of individuals with their respective names and birthdays. For example, the logic statement about Alice $P(p_1) \wedge \text{name\_of}(p_1)=\text{"Alice"} \wedge \text{birthdate\_of}(p_1)=\text{"11/23"}$ is represented via a three vertex, two edge attributed subgraph as shown in FIG. 15a. In a Black Box system, this subgraph is generated by Alice's input adapter and passed to her input converter for transition into the Black Box.

To test the Birthday Paradox, the name and birthday of every person $p \in P$, must first be loaded into the box. This is accomplished by converting the graph representation of every individual's logic statement into a graph protocol message to transition the Black Box boundary. This protocol is very rigid so that no other form of access can occur over the input channel, and so that the implementation (say, via FPGA) can be subsequently verified. This message protocol is defined via the following grammar:

```
Non-terminals:
  <graph_message:>    ::=  <SOG> <graph> <EOG> <checksum>
  <graph>             ::=  <vertex_message> | <vertex_message> <graph> |
                           <edge_message> | <edge_message> <graph>
  <vertex_message>    ::=  <SOV> <vertex> <EOV>
  <vertex>            ::=  <person_type> <identifier> |
                           <name_type> <name> |
                           <birthdate_type> <birthdate>
  <edge_message>      ::=  <SOE> <edge> <EOE>
  <edge>              ::=  <edge_type><vertex> <vertex>
  <edge_type>         ::=  <birthdate_of_type> |
                           <name_of_type>
Terminals:
  <SOG>               ::=  start_of_graph_operation_code {e.g. "0"}
  <EOG>               ::=  end_of_graph_operation_code {e.g. "1"}
  <SOV>               ::=  start_of_vertex_operation_code {e.g. "2"}
  <EOV>               ::=  end_of_vertex_operation_code {e.g. "3"}
  <SOE>               ::=  start_of_edge_operation_code {e.g. "4"}
  <EOE>               ::=  end_of_edge_operation_code {e.g. "5"}
  <person_type>       ::=  person_vertex_type_code {e.g. "0"}
  <name_type>         ::=  name_vertex_type_code {e.g. "1"}
  <birthdate_type>::=  birthdate_vertex_type_code {e.g. "2"}
  <name_of_type>      ::=  name_of_edge_type_code {e.g. "3"}
  <birthdate_of_type> ::=  birthdate_of_vertex_type_code {e.g. "4"}
  <identifier>        ::=  unique_identifier {e.g. 64-bit integer}
  <name>              ::=  fixed_length_alpha_string {e.g. 50 characters}
  <birthdate>         ::=  fixed_length_numeric_string {e.g. 4 characters in "MMDD" format}
  <checksum>          ::=  computed_checksum
```

For Alice to share her birthdate (i.e. November 23) via the Black Box, her input converter would transform her subgraph representation into the following graph message for transmission into the Black Box.

```
[SOG]
[SOE]
[name_of_type = 3]
[SOV]
[person_type = 0]
[identifier = p_1]
[EOV]
[SOV]
[name_type = 1]
[name = "Alice"]
[EOV]
[EOE]
[SOE]
[birthdate_of_type = 4]
[SOV]
[person_type = 0]
[identifier = p_1]
[EOV]
[SOV]
[birthdate_type = 2]
[birthdate = 01/23]
[EOV]
[EOE]
[EOG]
[checksum]
```

This message would be received by Alice's Black Box input isolator and converted back to the subgraph form for subsequent merging into the Black Box's internal graph data structure. Assuming Bob and Carol performed the same process with their private information, the graph contents of the Black Box, although it would not be visible to anyone, would be as shown in FIG. 15b. Now suppose Sam decides that he too wants to participate in the group, and his birthday, unbeknownst to the others, is also on February 4, expressed as $P(p_4) \wedge \text{name\_of}(p_4)=\text{"Sam"} \wedge \text{birthdate\_of}(p_4)=\text{"02/04"}$ Following the same process, the contents of the Black Box graph would then be as shown in FIG. 15c.

When the group is finally content that enough people have shared their information with the Black Box, the box could then be asked the question if any two of them share the same birthdate. That is, does $L = \exists p,q | P(p) \wedge P(q) \wedge \text{birthdate\_of}(p)=\text{birthdate\_of}(q) \wedge p \neq q = \text{TRUE}?$ As with the information about each individual, so too can this logic statement (pattern) be specified as a graph for input to the Black Box (via the pattern channel) as shown in FIG. 16.

This graph can subsequently be transmitted to the Black Box (via the pattern converter) using the following message:

```
[SOG]
[SOE]
[birthdate_of_type = 4]
[SOV]
[person_type = 0]
[identifier = p]
[EOV]
[SOV]
[birthdate_type = 2]
[birthdate = ?]
[EOV]
[EOE]
[SOE]
[birthdate_of_type = 4]
[SOV]
[person_type = 0]
[identifier = q]
[EOV]
[SOV]
[birthdate_type = 2]
[birthdate = ?]
[EOV]
[EOE]
[EOG]
[checksum]
```

This message is received by the Black Box via the pattern converter, and transformed back into a subgraph structure. This subgraph is then passed to the logic engine where it is specifically interpreted as a graph query (i.e. a pattern), not as new graph information as per that received via the source input channels. The vertex value "?" is a special value interpreted by the Black Box as a variable for pattern matching whenever received via its pattern channel.

Within the Black Box, this pattern is then used by the logic engine for conventional inference. For this example, the box output channel need only be a single electric light that turns on whenever L=TRUE, remaining off otherwise. The internal graph structure, however, enables a significant performance opportunity. Determining if two individuals have the same birthday requires simply examining only those vertices of type birthday and determining if any have an in-degree greater than 1. Depending upon how the internal graph data structure is organized, this determination can be done very fast for this and problems of significantly higher scale.

In a second exemplary black box use case, consider the fact pattern of Umar Farouk Abdulmutallab. On Christmas Day in 2009, 23-year-old Nigerian Umar Farouk Abdulmutallab traveled from Ghana to Amsterdam where he successfully boarded Northwest Airlines Flight 253. Concealed upon him were plastic explosives sewn in his underwear that he attempted but failed to detonate properly. Reports at that time indicated that the U.S. had received intelligence regarding a planned attack by a Yemen-based Nigerian man. Well in advance of the flight, the Watchlisting Office at the National Counterterrorism Center (NCTC) had created a basic terrorist record for Abdulmutallab in the Terrorist Identities Datamart Environment (TIDE), the U.S. Intelligence Community's central repository of international terrorist identities.

In the airline and travel industry, the computer reservation systems maintain a passenger name record (PNR) for each individual or groups of passengers that are traveling. Each PNR contains itinerary information along with personal identifying information such as name, gender, passport details, date and place of birth, etc. The European Union (EU) places strict constraints on how this PNR information is shared. Through a series of complex international negotiations, a collection of PNR sharing agreements have resulted between the EU and the United States, and many other countries. For the U.S., these treaties forbid the sharing of this information for U.S. Intelligence purposes. Rather, they designate the Department of Homeland Security as the executor of this information, restricting the use of PNR for domestic security purposes only with strict handling guidelines. On Dec. 25, 2009, a PNR for Abdulmutallab existed in the airline reservation system. As a result of a complex series of now well-published information sharing failures, Abdulmutallab nevertheless retained a valid U.S. tourist visa to enter the United State that had not been revoked by the U.S. State Department. Similarly, Abdulmutallab was not placed in the "Terror Screening Database", on the "Selectee List", nor on the "No-Fly List" that existed at that time. In simple terms, the EU reservation systems held a PNR that indicated Abdulmutallab was traveling on Flight 253 and the U.S. Intelligence Community held a TIDE record indicating Abdulmutallab as a terrorist identity, but the two "dots" could not be connected via the existing privacy rules and regulations. The Black Box provides a simple solution to this problem.

To illustrate how this is accomplished, let the set $P=\{p_1, p_2, \ldots p_n\}$ represent the population of n passengers for which there exists a PNR in the EU reservation system. Let the set $F=\{f_1, f_2, \ldots f_x\}$ represent the set of all x flights departing or arriving in the EU. Let the set $T=\{t_1, t_2, \ldots t_m\}$ represent the set of m terrorists maintained by the U.S. Intelligence Community in their database. From the EU airline reservation systems, statements describing individuals traveling on flights (i.e. PNR records) are expressed to the Black Box via its designated adapter as follows:

$$P(p_i) \wedge F(f_j) \wedge \text{name\_of}(p_i)=\text{passenger\_name} \wedge \text{flight\_of}(p_i)=f_j$$

where the predicate $P(p_i)$ is interpreted as "$p_i \in P$ is a person", the predicate $F(f_j)$ is interpreted as "$f_j \in F$ is a flight", and the functions name_of and traveling_on return the name and flight, respectively, for that person. For example, $$P(p_1) \wedge F(f_{123}) \text{name\_of}(p_1)=\text{"Alice Angle"} \wedge \text{flight\_of}(p_1)=f_{123}$$

$$P(p_2) \wedge F(f_{253}) \text{name\_of}(p_2)=\text{"Karl Kind"} \wedge \text{flight\_of}(p_2)=f_{253}$$

$$P(p_3) \wedge F(f_{253}) \text{name\_of}(p_3)=\text{"Umar Farouk Abdulmutallab"} \wedge \text{flight\_of}(p_3)=f_{253}$$

From the U.S. Intelligence Community, statements describing terrorist identities (i.e. TIDE records) are expressed to the Black Box as $$T(t_i) \wedge \text{name\_of}(t_i)=\text{terrorist\_name}$$

where the predicate $T(t_i)$ is interpreted as "$t_i \in T$ is a suspected terrorist", and the function name_of returns the name of the terrorist suspect. For example, $$T(t_1) \wedge \text{name\_of}(t_1)=\text{"Boris Badenov"}$$

$$T(t_2) \wedge \text{name\_of}(t_2)=\text{"Umar Farouk Abdulmutallab"}$$

The role of the Black Box then is to determine the truth value of the logic statement L (i.e. the Black Box pattern), and output the flight designator f whenever a true pattern occurrence is detected:

$$L(f) = \exists p, t | P(p) \wedge T(t) \wedge \text{name\_of}(p) = \text{name\_of}(t) \wedge \text{flight\_of}(p) = f$$

To accomplish this in a general-purpose fashion, the Black Box again uses the same graph-based structure as before. For backward compatibility with the Birthday Paradox, additional vertex type codes for flights (type code 5) and terrorists (type code 6) are simply added to the graph message protocol and the internal Black Box graph representation. Similarly, a new edge type code for flight_of (type code 7) is also added, yielding:

| Vertex type | Type Code | Vertex Value |
|---|---|---|
| | 0 | integer (UUID) |
| person name | 1 | fixed length alpha string (e.g. max. of 50 characters) |
| flight | 5 | integer (UUID) |
| terrorist | 6 | integer (UUID) |

| Edge type | Type Code |
|---|---|
| name of | 3 |
| flight of | 7 |

The above PNR statements are represented via the subgraphs shown in FIG. 17a. These subgraphs are transmitted to the Black Box (via the designated EU PNR input converter) with the following messages:

| Alice PNR | Karl PNR | Umar PNR |
|---|---|---|
| [SOG] | [SOG] | [SOG] |
| [SOE] | [SOE] | [SOE] |
| [name_of_type = 3] | [name_of_type = 3] | [name_of_type = 3] |
| [SOV] | [SOV] | [SOV] |
| [person_type = 0] | [person_type = 0] | [person_type = 0] |
| [identifier = $p_1$] | [identifier = $p_2$] | [identifier = $p_3$] |
| [EOV] | [EOV] | [EOV] |
| [SOV] | [SOV] | [SOV] |
| [name_type = 1] | [name_type = 1] | [name_type = 1] |
| [name = "Alice Applebee"] | [name = "Karl Kind"] | [name = "Umar Farouk Abdulmutallab"] |
| [EOV] | [EOV] | [EOV] |
| [EOE] | [EOE] | [EOE] |
| [SOE] | [SOE] | [SOE] |
| [flight_of_type = 7] | [flight_of_type = 7] | [flight_of_type = 7] |
| [SOV] | [SOV] | [SOV] |
| [person_type = 0] | [person_type = 0] | [person_type = 0] |
| [identifier = $p_1$] | [identifier = $p_2$] | [identifier = $p_3$] |
| [EOV] | [EOV] | [EOV] |
| [SOV] | [SOV] | [SOV] |
| [flight_type = 5] | [flight_type = 5] | [flight_type = 5] |
| [identifier = $f_{123}$] | [identifier = $f_{253}$] | [identifier = $f_{253}$] |
| [EOV] | [EOV] | [EOV] |
| [EOE] | [EOE] | [EOE] |
| [EOG] | [EOG] | [EOG] |
| [checksum] | [checksum] | [checksum] |

The above logic statements about terrorists "Boris" and "Umar" are represented via the subgraphs illustrated in FIG. 17b. These subgraphs are transmitted to the Black Box (via, e.g., the designated U.S. Intelligence Community input converter) with the following messages:

| Boris | Umar |
|---|---|
| [SOG] | [SOG] |
| [SOE] | [SOE] |
| [name_of_type = 3] | [name_of_type = 3] |
| [SOV] | [SOV] |
| [terrorist_type: 6] | [terrorist_type = 6] |
| [identifier = $t_1$] | [identifier = $t_2$] |
| [EOV] | [EOV] |
| [SOV] | [SOV] |
| [name_type = 1] | [name_type = 1] |
| [name = "Boris Badenov"] | [name = "Umar Farouk Abdulmutallab"] |
| [EOV] | [EOV] |
| [EOE] | [EOE] |
| [EOG] | [EOG] |
| [checksum] | [checksum] |

The resulting aggregated graph that appears within the Black Box (though not visible to anyone) is shown in FIG. 17c. And the graph representation for the Black Box search pattern is shown in FIG. 18a. Upon approval by the privacy body, this pattern (FIG. 18a) is input to the Black Box via the pattern adapter-converter channel via the following message:

```
[SOG]
[SOE]
[name_of_type = 3]
[SOV]
[person_type = 0]
[identifier = p]
[EOV]
[SOV]
[name_type = 1]
[name = ?]
[EOV]
[EOE]
[SOE]
[name_of_type = 3]
[SOV]
[terrorist_type = 6]
[identifier = t]
[EOV]
[SOV]
[name_type= 1]
[name = ?]
[EOV]
[EOE]
[SOE]
[flight_of_type = 7]
[SOV]
[person_type = 0]
[identifier = p]
[EOV]
[SOV]
[flight_type = 5]
[flight = [OUTPUT]]
[EOV]
[EOE]
[EOG]
[checksum]
```

Within the logic engine the execution (search) of this pattern requires a straight forward reasoning process readily handled by most modest inference engines. As specified in the approved input pattern, the Black Box outputs a simple one-vertex subgraph for each pattern detected. For the above example, this consists of the simple graph shown in FIG. 18b transmitted via the following graph exchange message:

```
[SOG]
[SOV]
[flight_type = 5]
```

-continued

```
[EOV]
[EOG]
[checksum]
```

The above example illustrates how both private and very sensitive (e.g. classified) information about individuals can be examined while maintaining privacy. In this case, the Black Box outputs only the flight identifier, indicating that there is a valid terrorism concern, but without any U.S. entity ever needing to exam the protected PNR information, nor the EU ever needing to exam the classified TIDE information. Without requiring any new legal mechanisms, the organizations involved here can use their existing investigate authorities to locate the specific individual, given that a specific terrorist threat has been established for a specific flight. Via existing treaty, the U.S. and the EU already have mechanisms in place to rapidly expedite this investigative process under such compelling circumstances.

The Abdulmutallab incident described above was heralded as a significant intelligence failure that prompted the President to initiate a major review of the intelligence process with an extensive investigation and senate committee hearings. These investigations resulted in significant changes to international travel and Intelligence Community operations.

Today, more than five years later, the disappearance of Malaysian Flight 370 has revealed the existence of the same types information sharing challenges and trust issues. Two individual were allowed to board the aircraft with passports known to have been stolen from citizens in European countries. While Interpol maintains a database of lost and stolen passports, few countries consistently use this database due to privacy concerns. The Black Box approach promises a robust solution to this unresolved, recurring problem.

The Black Box solution also finds applicability in the "name resolution" use case. In today's information age, organizations frequently provide overlapping services to individuals. Such overlap can be costly, resulting in unnecessary duplication and expenditure of resources. Resolving this overlap, however, can be extremely complex and time-consuming. Where individuals live, where they work, and how and where they receive these services, and how and when these might change can all vary. Further complicating this process is the incompleteness, errors, and ambiguity in the information each organization may associate with an individual. The spelling of names, accuracy of birthdates, absence of a consistent universal identifier (e.g. in the U.S., a Social Security Number), etc. all compound this resolution complexity. Given the sensitive nature of the personal information and the complex policies and law regarding its proper handling, organizations unfortunately are often forced to resort to costly, time-consuming manual methods to address duplication discrepancies. An application of the Black Box approach to privacy to help automate this process in near real-time fashion while maintaining and preserving the privacy of each individual's information is described.

In a particular implementation of the solution to the name resolution use case Black Box system consists of a single, self-contained computer that is physically contained within a steel reinforced enclosure with multiple security locks (one for each participating organization). This unit is intended to be housed in a non-descript, limited access Tier 3 data center facility with 24/7 video motion detected alarm surveillance. The enclosure is configured such that the computer within cannot be removed without resulting in loss of its electrical power. The computer itself is delivered sealed from the factory and is installed and configured only in the presence of security representatives from each organization. The computer is equipped with the most minimal of services, disabling nearly all features including the removal of keyboard and mouse input, video display, and unnecessary operating systems components. The disk contents are secured with high-grade encryption. All wireless interfaces (e.g. WiFi and Bluetooth) are disabled, and no external I/O devices may be attached nor ports accessed once secured within the enclosure.

The operating system, network, and supporting firewall infrastructure are configured to allow only secure file transfer access into and out of specific directories, one directory allocated for each participating organization. The only operations that are permitted by an organization are reading, writing and deleting files in their respective directories. All file accesses are performed via high-grade commercial public-key end-to-end encryption. No other external operations are possible with the enclosure/computer other than the removal of its network connection and or the unplugging of its power cord. All administration services, login capabilities, web services, e-mail, etc. have been disabled and/or removed. Specifically, the computer is configured to execute one program and one program only. That is, the computer executes only the single program that has been tested, inspected, and unanimously approved by the policy/oversight body, which in this case is to consist of the security representatives from each organization. In this Type 3 device configuration, it is this single program that implements the privacy device's "pattern" detection algorithm referenced above.

The security configuration process for this device is meticulous and comprehensive requiring the presence of multiple individuals in order to make even the slightest of changes. As a result, the reliability of this device and its correctness is of highest concern. Failure to accurately compute results or properly protect the information contained within renders the device useless, with significant loss of confidence from each of the participating organizations and their constituency. Consistent with its design goals, the Ada programming language is selected for the pattern-matching algorithm implementation, discussed below.

Operation of this privacy device is intentionally very simple. In order for organizations to identify potential duplication issues, each must generate a data file that contains a set of records for the individuals covered in their respective databases. For the initial prototype system, key fields include:

Last name (bounded Latin-1 Unicode string)
First name (bounded Latin-1 Unicode string)
Date of birth (Latin-1 string; YYYYMMDD format)
Gender ("M" or "F" or "U" if unknown)
Ethnicity (enumerated type)
Universal identifier (e.g. U.S. SSN, if it exists)
Local identifier (bounded Latin-1 Unicode string)

Using an agreed upon data file format for these records, each organization must securely transfer its file to its respective directory on the privacy device computer. Within the computer, a single program is running that continuously examines each of the directories for new data files. When a new data file is detected, the file is ingested, an in-memory representation of the data is created, and the filed is immediately security deleted using multiple file re-writes. The directory scan time and file ingest time are specifically engineered so that the raw data files from contributing organizations resides on the computer disk for a minimal amount of time (e.g. <1 second).

Whenever a new data representation is obtained for an organization, any old representation is immediately discarded (released in memory), and the new representation is compared against the representations held for each of the other organizations. After the comparison is made, an output file is prepared for each organization, identifying only those matches that are made with records for another organization. Match files remain in a directory until deleted by the respective organization (or whenever the privacy device system is restarted via power cycling). To further prevent PII exposure, the match files contain only the local organization's unique identifiers, and no other source data fields. Each of the participating organizations can then use these identifiers to discuss possible lost-to-care or duplicate-care issues with the other corresponding organizations.

As the privacy device computer intentionally contains no console or display that enables anyone to ascertain its operating status, the pattern-matching program maintains a simple log file in each organization's directory. This log contains the dates and times of ingested data files, when the matching process is performed, and the generated match files. Any errors detected in the input data files are reported back to the respective organization through this log mechanism.

The component of greatest concern is arguably the pattern-matching algorithm (program) contained within the privacy device. From a reliability perspective, if this program were to fail (e.g. via an uncaught constraint error exception), the end users of this system would have no way of knowing when or the cause. Although encrypted, such a failure could result in a file containing PII persisting far beyond it expected (very short) lifetime on the device. Such failures, however, could also severely jeopardize an organization's confidence and trust in the device. If the device is not reliable, organizations may be justifiably skeptical of its accuracy and its ability to protect such important information. The resulting loss of trust would render the privacy device of little or no value, with the possibility of introducing harm via improper disclosure or wasted time pursuing inaccurate results. Thus, the reliability of the algorithm is of utmost importance to the process.

The Ada programming language was selected for the algorithm implementation. Its unambiguous semantics, extremely strong type and constraint checking, exception protections, and overall reliability philosophy were key ingredients leading to this decision.

The main subprogram of the prototype algorithm is the following infinite loop:

```
with Black_Box; use Black_Box;
procedure Main is
begin
    Initialize;  -- Erase/build directories & logs
    loop
        if Update then  -- Check for new data files
            Analyze;    -- Search for matches
            Report;     -- Report matches
            Clear;      -- Clear matches
        end if;
        delay scan_time;
    end loop;
end Main;
```

The subprogram Initialize is used to create each organization's directory and corresponding log file should, they not already exist. It the directory does exist, its contents is erased, ensuring a fresh start. The package Black_Box contains the data structures that represent each organization's data set representation and resulting cross organizational matches, along with the operations that act upon them (Update, Analyze, Report, and Clear). Each of these subprograms is coded so that they successfully complete, regardless of any internal exceptions that might result.

Of all the subprograms, Update is perhaps the most worrisome and complex as it involves the ingestion of external data files. While each organization agrees to a single input format, the algorithm can make no assumptions regarding the input file's compliance with that format as an uncaught constrain failure would render the system painfully inoperative. Thus when a new data file is detected within Update, the input file must be carefully parsed to ensure proper range values and format. In actual practice, it is not uncommon for the source databases to contain blank fields or legacy field formats containing various wild card characters or special values for missing data elements (e.g. a birth year, but no birth month or day, or "000-00-0000" when a SSN is unknown). The Update subprogram's job is to reliably parse through all these various possibilities, reporting format errors back to an organization through its log file, ultimately creating a vector of properly type constrained person records for the corresponding organization. If the process is successful, Update returns a true value. However, if an unrecoverable problem is detected, false is returned, precluding the subsequent matching and reporting operations from executing until a new data file is received for the organization.

For an initial pilot system, the following person record definition is used, where each record component is a fixed length string, bounded string, or enumeration type:

```
type person is
    record
        org_id         : identifier;
        last_name      : name_string;
        first_name     : name_string;
        last_soundex   : name_string;
        first_soundex  : name_string ;
        dob            : dob_string;
        ssn            : ssn_string;
        gender         : sex;
        race           : ethnicity;
        partial_ssn    : boolean;
        partial_dob    : boolean;
    end record;
```

With a successful (true) completion of Update, the remaining operations Analyze and Report are far less perilous as all data structures are now properly type and range constrained in comfortable Ada fashion. The primarily role of Analyze is to create a vector of match records across all of the person representations. Match records contain enumeration values that identify the organization, their respective person record unique identifiers, and a set of boolean values that characterize which and how their fields match including the incorporation of fuzziness based on Soundex values for first and last names and partial matches on date of birth and SSN. Match records are defined as follows:

```
type match is
    record
        o1    : organization;
        o2    : organization;
        uid1  : identifier;
```

```
       uid2           : identifier;
       last_name      : Boolean    := false;
       first_name     : Boolean    := false;
       last_soundex   : Boolean    := false;
       first_soundex  : Boolean    := false;
       dob            : Boolean    := false;
       partial_dob    : Boolean    := false;
       sex            : Boolean    := false;
       ssn            : Boolean    := false;
       partial_ssn    : Boolean    := false;
       score          : scoring    := none;
   end record;
```

Match records also contain a score field that characterizes the degree of match based on criteria established in advanced by the organizations. The value of this score ranges from an exact match down to a very low match as defined by the following enumerated type:

```
   type scoring is (exact, very_high, high, medium_high,
                   medium, medium_low, low, very_low);
```

The actual scoring criteria is encoded within the Analyze subprogram via a sequence of if-then-else if conditional style statements similar to the following, where the record m is of type match:

```
   if
       (m.last_name and m.first_name and m.dob and
         m.ssn and m.sex) then
               m.score := exact;
   elsif
       (m.last_name and m.first_name and m.dob and
         m.sex) or m.ssn then
               m.score := very_high;
   elsif
       ...
       ...
   elsif
       ...
       ...
               m.score := very_low;
   end if;
```

The subprogram Report has very a predictable role and behavior, predominately using Ada.Text_IO to create output files in each of the appropriate organization directories to report the matching results. To ensure no memory leaks, the remaining Clear subprogram is used to properly release the dynamic data structures used in the matching process, before repeating the entire process after a short specified time delay.

The embodiments described herein provide an approach (system and method) for organizing and analyzing our new data-centric world, sharing information derived from that data across multiple institutions, and unifying this information into a common global knowledge framework in support of scientific analysis at a scale never before possible. This approach was specifically formulated to address complex problems related to global security, world health, and planet sustainability. Through the creation of this single replicable infrastructure component, a powerful method for information sharing and analytic operability results, allowing institutions both large and small with different computational resources to participate. As a result, the emerging knowledge space enables multi-disciplinary integrative research with a fidelity and diversity previously unobtainable. In addition, the approach can be recursively applied, enabling research communities working at various levels of abstraction to computationally interact, from the macroscopic such as climatic, geologic, and sociopolitical systems, to the microscopic such as biological, cellular, and genomic systems.

The embodied infrastructure component provides an innovative method for multiple institutions to meaningfully collaborate within a single unified, scalable computational fabric. This interoperability is achieved through the creation of shared "knowledge space" that overlays the data infrastructures of the participating institutions. This space is specifically designed to accommodate models of complex interdependent systems at global scale. Furthermore, participants create this space using opt-in/opt-out semantics, requiring minimal data replication and movement. Instead, the technique employs a data adapter process that transforms source data into sets of entities, relationships, and accompanying attributes, all expressed and shared within this single space, yet managed by the data owner. The managed ontology that accompanies this space is readily extensible, enabling broad application across many diverse scientific domains.

In an exemplary use case, one or more of the embodiments described herein were implemented to facilitate cross jurisdictional HIV data sharing. The HIV care continuum depicts the stages of health system engagement for those living with HIV disease. This model assists the public health community by quantifying care engagement in steps along the continuum. However, ambiguities limit its utility when applied to cross jurisdictional regions. More specifically, its inherent linear assumption does not account for the churn effect (person in¬-and-out migration for HIV care) across jurisdictional boundaries. Addressing this challenge requires a structured and consistent data-sharing mechanism in such regions. However, traditional data sharing across jurisdictions is legally challenging, technologically time-consuming, and organizationally quite complex.

The cross jurisdictional District of Columbia (DC) metropolitan region, including areas in DC, Maryland (MD), and Virginia (VA), experiences some of the highest prevalence rates among key population groups in the country, and is therefore critical to the national response to HIV. This region has long observed that persons migrate from one jurisdiction to another and cross borders for HIV care, or changes place of residence or places of both residence and care. The need for a novel real-time and automated approach to data sharing in this cross jurisdictional area, which could simultaneously account for the highly private and sensitive nature of HIV data was identified. By implementing the shared knowledge space infrastructure discussed herein across relevant data sources, it just took 21 minutes and 58 seconds of processing time to identify 21,472 person matches in HIV surveillance (eHARS) data across DC, MD and VA.

The benefits of implementing the present embodiments in this example are numerous and include the ability to validate new HIV cases in an automated and real-time fashion, replacing a cumbersome manual process with a streamlined process providing more immediate opportunities to intervene in new case diagnoses, or for sharing information about persons who have moved with fellow jurisdictions. The data-sharing agreements developed here can also benefit future collaborative efforts by serving as templates. The HIV community faces a new era of engagement in HIV care, in which HIV-infected individuals live longer with the disease, and where mobility and technology are becoming increasingly more common in everyday life. Effectively adapting to this new era requires re-examining traditional, and brainstorming new HIV surveillance data sharing models and technology. Developing the organizational processes that facilitate such activities are essential to improving HIV surveillance informing care and prevention services, and ultimately achieving better health outcomes.

The knowledge-share infrastructure described herein can be implemented to analyze human responses (e.g., forced migration) to numerous environmental and man-made changes, including, but not limited to: major weather and geological events (e.g., floods, hurricanes, tsunamis, earthquakes, drought); war; famine; disease outbreaks; and the like. In a second exemplary use case, the infrastructure has been implemented to focus on human responses to floods in terms of people's perceptions, expectations and intentions as they anticipate and experience the onset and aftermath of storm-driven flooding, specifically in Hoboken, N.J. The use case incorporates the 7 billion person-entity Sapien Database developed and maintained by Georgetown University; a high-fidelity simulation of the physical layout and structure of Hoboken, N.J. developed and maintained by Stevens Institute of Technology; a storm surge model that predicts water levels on each block, over time, depending on the selected severity of the storm (developed by Stevens Institute of Technology); and a model of local perception of threat (developed by Georgetown University).

Applying the knowledge-share infrastructure described herein to these separate sources enables multi-site collaboration of scientists using dispersed databases, distinct analytics, and existing visualization tools on a significant problem in a densely-populated location in the United States.

Each element of this second use case currently exists but in isolation from each other. For example, in collaboration with the city of Hoboken, Stevens has instrumented the entire city of Hoboken with sensors that feed relevant data to archives on the Stevens campus. Alan Blumberg has developed the hydrology model that quite accurately predicts the degree and spatial location of flooding in the Hoboken-New York City region. Stevens hosts Virtual Hoboken, a high fidelity, three-dimensional replica of Hoboken that was built with LIDAR imagery and is interactively visualized in Stevens' Immersion Lab with 8' by 20' 180 degree touch sensitive screens. Using Virtual Hoboken, a user can virtually walk (or fly) around the city and see the view from any window of any building. Further, employing data from LANDSCAN at Oak Ridge National Laboratory and other sources, the Sapien database at Georgetown University maps 7 billion statistical persons to their location on the globe in a hypergraph-structured knowledge base. Georgetown has also developed a model of local perception of threat that helps anticipate the movement of people when faced with local threats in menacing contexts. Applying the knowledge-share infrastructure as described herein to these sources, using an ontology devised in accordance with the modeling, enables scientists from Stevens and Georgetown to collaborate on research about urban resilience using these resources without moving the data, analytics or the visualization center from their current institutional homes.

More particularly, as described above, the knowledge-share infrastructure uses an ontology to coordinate the parts of the distributed hypergraph stored by different organizations, on different servers, in different locations. Not all of the instances of the same class will be sustained by the same organization. For example, today Stevens Institute of Technology has a hydrology model that includes every building in Hoboken, N.J. We expect Stevens will create knowledge space entities for each of these buildings, entities of the class "Building". Similarly, today Georgetown sustains the Sapien database with 7 billion artificial persons, one for each person in the real world, geographically distributed the way that people are distributed in the world. These 7 billion entities in the knowledge space are all of class "Person". Many of these Georgetown-sustained people entities reside in buildings, and we thus expect Georgetown's analytic models to create entities of class "Occupant" to represent the relationships between the people and the buildings in which they reside.

The following discussion provides a brief, general description of a suitable computing environment to implement embodiments set forth herein. In accordance with various Figures above, including but not limited to, FIGS. 1, 4, 6, 8, and 12-14 and the descriptions thereof, embodiments may be implemented using various and different combinations of hardware and software in different physical locations. Example computing devices include, but are not limited to, personal computers, server computers or server farms, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Individual computing devices configured to implement one or more embodiments provided herein include at least one processing component and memory. Depending on the exact configuration and type of computing device, memory may be volatile (such as RAM, for example), non-volatile (such as ROM, flash memory, etc., for example) or some combination of the two. The individual computing devices may include additional features and/or functionality such as additional storage (e.g., removable and/or non-removable) including, but not limited to, magnetic storage, optical storage, and the like. Examples of computer storage media include, but are not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by one or more computing devices. Any such computer storage media may be part of the one or more computing devices.

Individual computing devices also include communication connection(s) for facilitating communication with other devices. Such communication connection(s) include, but are not limited to, a modem, a Network Interface Card (NIC), an integrated network interface, a radio frequency transmitter/receiver, an infrared port, a USB connection, or other interfaces for connecting computing devices. Communication connection(s) may include a wired connection or a wireless connection and may operate in transmit and/or receive modes.

Computing devices may include or be connected to input device(s) such as keyboard, mouse, pen, voice input device, touch input device, infrared cameras, video input devices, and/or any other input device. Similarly, computing devices may include or be connected to output device(s) such as one or more displays, speakers, printers, and/or any other output device. Input and output device(s) may be connected to computing devices via a wired connection, wireless connection, or any combination thereof.

Components of computing devices may be connected by various interconnects, such as a bus. Such interconnects may include a Peripheral Component Interconnect (PCI), such as PCI Express, a Universal Serial Bus (USB), firewire (IEEE 1394), an optical bus structure, and the like. Components of computing devices may be interconnected by a network and need to not be in the same physical locations.

Those skilled in the art will realize that storage devices utilized to store computer readable instructions may be distributed across a network. For example, a computing device accessible via network may store computer readable instructions to implement one or more embodiments provided herein. Computing device may access other computing devices and download a part or all of the computer readable instructions for execution. Alternatively, computing devices may download pieces of the computer readable instructions, as needed, or some instructions may be executed at different computing devices connected over a network.

Various operations of embodiments are provided herein. In one embodiment, one or more of the operations described may constitute computer readable instructions stored on one or more computer readable media, which if executed by a computing device, will cause the computing device to perform the operations described. Unless so stated, the order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

One skilled in the art recognizes that although the disclosure has been shown and described with respect to one or more embodiments, equivalent alterations and modifications are anticipated upon a reading and understanding of this specification and the annexed drawings. The disclosure includes all such modifications and alterations and is limited only by the scope of the following claims.

The invention claimed is:

1. A process for organizing data from multiple heterogeneous data sources in a knowledge hypergraph, the knowledge hypergraph being accessible by multiple unrelated analytics operating on one or more analytics engines, the process comprising:

receiving a first data set from a first data source at a first of multiple hypergraph servers;

graphing by the first of multiple hypergraph servers first data from the first data set in a knowledge hypergraph in accordance with a knowledge model (M), the knowledge hypergraph being defined by hypergraph elements including hypervertices and hyperedges, wherein attributes of the first data are represented in the hypergraph by first state vectors affixed to one or more hypergraph elements;

receiving a second data set from a second data source at a second of multiple hypergraph servers;

graphing by the second of multiple hypergraph servers second data from the second data set in the hypergraph, wherein attributes of the second data are represented in the hypergraph by second state vectors affixed to one or more hypergraph elements;

further wherein at least one of the first state vectors and at least one of the second state vectors is affixed to the same hypergraph element;

receiving at the first hypergraph server from a first of the one or more analytics engines a search request initiated by a first analytic and directed to the hypergraph; and querying by the first hypergraph server the hypergraph, wherein query results include attributes from both the first data and the second data;

wherein the hypergraph exists as a distributed entity across the multiple hypergraph servers and further wherein the multiple hypergraph servers communicate peer-to-peer regarding the knowledge hypergraph using a defined hypergraph transfer protocol (HGTP).

2. The process according to claim 1, wherein the first data set and the second data set are received from the first and second hypergraph servers via a common hypergraph application programming interface.

3. The process according to claim 2, wherein the search request is submitted to the first hypergraph server and the query results are returned to the first analytic via the common hypergraph application programming interface.

4. The process according to claim 2, wherein the first and second hypergraph servers create new hypergraph elements in the knowledge graph responsive to a create primitive received from an associated adapter, the create primitive being defined by the common hypergraph application programming interface.

5. The process according to claim 4, wherein each of the created hypergraph elements includes a universally unique identifier (UUID) and further wherein the UUID includes embedded routing information to a persisted location of the created hypergraph element.

6. The process according to claim 5, wherein the persisted location of the created hypergraph element is one of the first source and the second source.

7. A process for requesting information from a distributed knowledge graph, the process comprising:

formulating, at a first adapter, a query directed to a first hypergraph element of the distributed knowledge graph using a common hypergraph application programming interface for processing by a first hypergraph server associated with the first adapter, the first hypergraph server being programmed to receive queries in a format of the common hypergraph application programming interface and further being programmed to communicate with other hypergraph servers using a defined hypergraph transfer protocol (HGTP);

packaging, by the first hypergraph server, the query into a HGTP query message and forwarding the query message to a second hypergraph server in accordance with first location instructions for the first hypergraph element at a second adapter;

receiving, by the second hypergraph server, the packaged query message, un-packaging the packaged query message and relaying the query to the second adapter;

retrieving results to the query from the associated first hypergraph element by the second adapter and returning the results to the second hypergraph server using the common hypergraph application programming interface; and packaging, by the second hypergraph server, the results into a HGTP results message and forwarding the results message to the first hypergraph server in accordance with second location instructions for the first adapter associated therewith.

8. The process according to claim 7, wherein the query includes a request for attributes associated with the first hypergraph element.

9. The process according to claim 8, wherein formulating the query includes providing a universally unique identifier (UUID) for first hypergraph element.

10. The process according to claim 9, wherein formulating the query includes providing a universally unique identifier (UUID), an identifier of the method and parameters of the method for first hypergraph element.

11. The process according to claim 7, wherein the query includes a request for invoking a method associated with the first hypergraph element, and further wherein retrieving results to the query from the associated first hypergraph element by the second adapter includes executing the method associated with the first hypergraph element and retrieving the results therefrom.

12. The process according to claim 7, wherein forwarding the packaged query message includes determining, by the first hypergraph server, the first location instructions for the first hypergraph element using the received UUID.

13. The process according to 7, wherein the packaged query message includes location instructions for the first adapter.

* * * * *